US009890765B2

(12) United States Patent
Tian et al.

(10) Patent No.: US 9,890,765 B2
(45) Date of Patent: Feb. 13, 2018

(54) LOAD COMPENSATING DEVICES

(71) Applicant: GE Infrastructure Technology, LLC, Greenville, SC (US)

(72) Inventors: Qing Tian, Gold River, CA (US); Jehan Z. Khan, Lisle, IL (US); Jonathon P. Baker, Roseville, CA (US)

(73) Assignee: GE Infrastructure Technology, LLC, Greenville, SC (US)

( * ) Notice: Subject to any disclaimer, the term of this patent is extended or adjusted under 35 U.S.C. 154(b) by 407 days.

(21) Appl. No.: 14/681,703

(22) Filed: Apr. 8, 2015

(65) Prior Publication Data
US 2016/0298599 A1 Oct. 13, 2016

(51) Int. Cl.
*F03D 7/02* (2006.01)
*B64C 21/08* (2006.01)
*F03D 1/06* (2006.01)

(52) U.S. Cl.
CPC ............ *F03D 7/022* (2013.01); *B64C 21/08* (2013.01); *F03D 1/0633* (2013.01); *F03D 7/0232* (2013.01); *F03D 7/0296* (2013.01); *F05B 2240/31* (2013.01); *F05B 2250/183* (2013.01); *Y02E 10/721* (2013.01)

(58) Field of Classification Search
CPC ...... F03D 7/022; F03D 7/0232; F03D 7/0296; F03D 7/0252; F03D 1/0633; F03D 1/0641; F03D 1/0675; F03D 1/0683; B64C 21/08; B64C 9/34; B64C 2009/005; F05B 2250/183; F05B 2240/31; Y02E 10/721
See application file for complete search history.

(56) References Cited

U.S. PATENT DOCUMENTS

| 4,117,995 A * | 10/1978 | Runge ................. B64C 9/146 244/130 |
| 6,368,059 B1 * | 4/2002 | Maines ................. B63H 1/15 415/914 |
| 6,902,370 B2 | 6/2005 | Dawson et al. |

(Continued)

FOREIGN PATENT DOCUMENTS

| EP | 1112928 A2 | 7/2001 |
| EP | 2343451 A1 | 7/2011 |
| WO | 2011157849 A2 | 12/2011 |

OTHER PUBLICATIONS

European Search Report and Opinion issued in connection with corresponding EP Application No. 16164225.1 dated Aug. 10, 2016.

(Continued)

*Primary Examiner* — Dwayne J White
*Assistant Examiner* — Adam W Brown
(74) *Attorney, Agent, or Firm* — Dority & Manning, P.A.

(57) ABSTRACT

Various air deflector shapes, sizes and configurations for use in a load compensating device on an airfoil are provided. The air deflector arrangements are configured to alter the airflow around the air deflector in order to affect sound or acoustics associated with the air deflector when deployed during operation. Some example configurations that may alter the air flow around the air deflector include air deflectors having a plurality of apertures, air deflectors including a scalloped edge, and/or air deflectors including a plurality of protrusions extending from a portion of the air deflector.

19 Claims, 24 Drawing Sheets

(56) References Cited

U.S. PATENT DOCUMENTS

| | | |
|---|---|---|
| 8,267,654 B2 | 9/2012 | Van et al. |
| 2010/0143151 A1* | 6/2010 | Kinzie .................. F03D 1/0675 |
| | | 416/248 |
| 2011/0274533 A1* | 11/2011 | Presz, Jr. .................. F03D 1/04 |
| | | 415/1 |
| 2012/0134803 A1 | 5/2012 | McGrath et al. |
| 2016/0298600 A1* | 10/2016 | Tian ..................... F03D 1/0675 |

OTHER PUBLICATIONS

CA Office Action issued in connection with corresponding CA Application No. 2925831 dated Mar. 16, 2017.

* cited by examiner

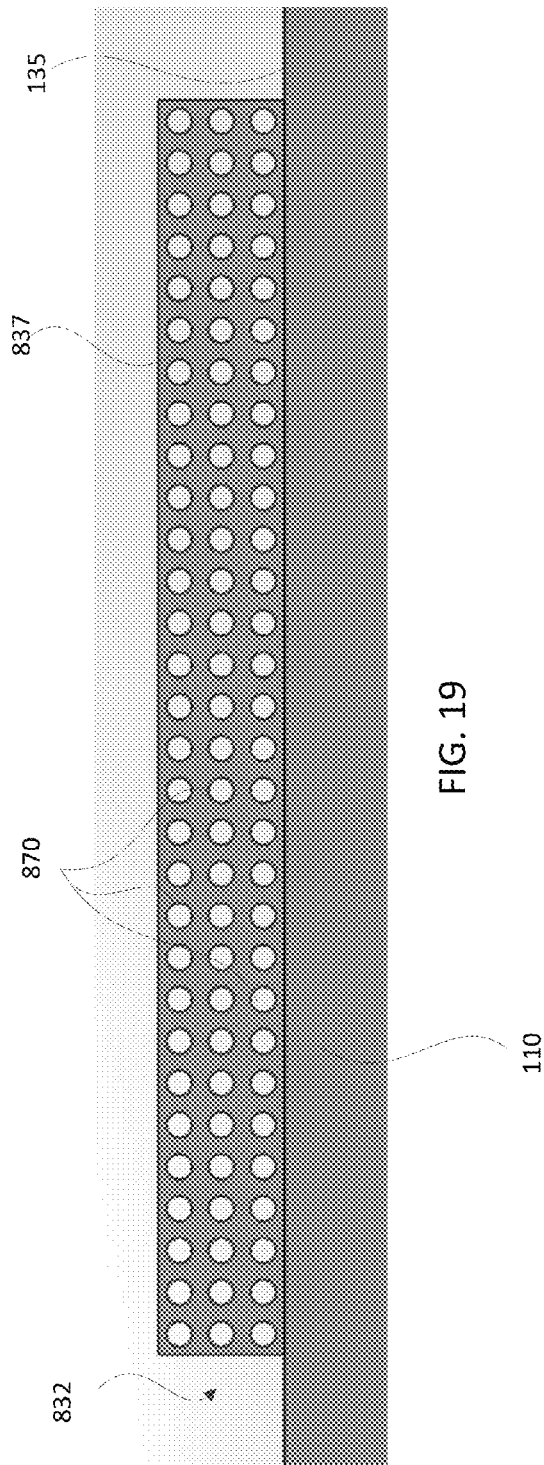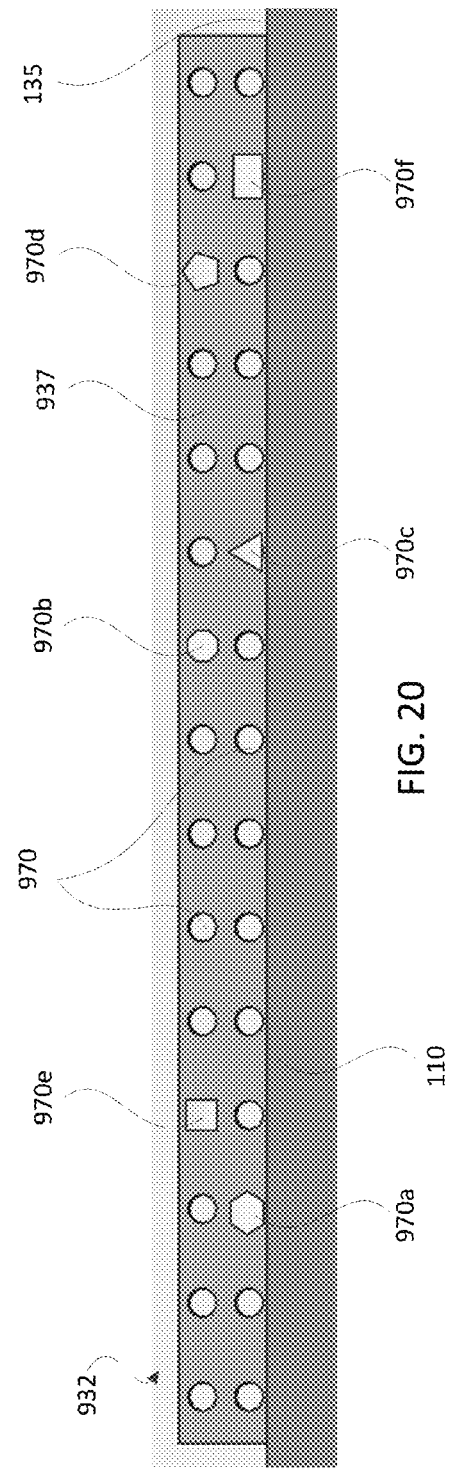

LOAD COMPENSATING DEVICES

BACKGROUND

Wind turbines create power proportional to the swept area of their blades. The choice of rotor attributes for a wind turbine, such as its diameter, is a design trade-off between longer blades for more energy production in low winds and shorter blades for load limitation in high winds. Thus, wind turbine having longer blades will increase the swept area, which in turn produces more power. However, at high wind speeds, a wind turbine having longer blades places greater demands on the components and creates more situations where the turbine must be shut down to avoid damaging components. Even in situations where the average wind speed is not high enough to cause damage, periodic wind gusts which change both the speed and direction of the wind, apply forces that may be strong enough to damage equipment.

Wind turbines also may generate sound or acoustics which can be disruptive to the surroundings. The sound may be caused by the vibration of components or airflow over the blades. The flow of air over the blades manifest sound or acoustics in various forms such as turbulence due to inflow, a turbulent boundary layer from the suction (top) and pressure (bottom) sides of the blade, flow separation, and the like.

In some wind turbine arrangements, deflectors are used to mitigate undesired wind turbine loading. However, the use of such deflectors may pose the penalty of increased wind turbine sound or acoustic levels.

BRIEF SUMMARY

The following presents a simplified summary in order to provide a basic understanding of some aspects of the disclosure. This summary is not an extensive overview. It is not intended to identify key or critical elements or to delineate scope. The following summary merely presents some concepts of the disclosure in a simplified form as a prelude to the more detailed description provided below.

Aspects of the arrangements described herein include air deflector configurations for use in a load compensating device on an airfoil. The air deflector configurations can be used on various types of airfoils, or airfoil-shaped devices or objects, including but not limited to, wind turbine blades, helicopter rotor blades, propellers, and the like. The air deflector configurations described herein aid in reducing load and reducing sound associated with the air deflector. Some example configurations that will be discussed more fully below include air deflectors having a plurality of apertures formed along the air deflector, air deflectors including a scalloped edge, and/or air deflectors including a plurality of protrusions or teeth extending from a portion of the air deflector.

These and various other arrangements will be discussed more fully below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 19 is an enlarged plan view of the air deflector of FIG. 18 according to one or more aspects described herein.

FIG. 20 is an enlarged plan view of an alternate air deflector configuration according to one or more aspects described herein.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure.

Aspects of the arrangements described herein may include a load compensating device mounted in an airfoil rotor blade. In some arrangements, the load compensating device may include a deployable device, such as an air deflector, and may be mounted to a wind turbine blade. To simplify discussion of the arrangements described herein, various aspects will be described in the context of a load compensating device mounted to a wind turbine blade or airfoil rotor blade. However, the features described herein may be used in a variety of devices and applications and nothing in the specification or figures should be viewed as limiting the invention to an air deflector mounted in a wind turbine blade.

During operation of the wind turbine, the air deflector may be deployed to manage loads and/or optimize operation of the wind turbine. The air deflector may be configured in a variety of different ways (e.g., different shapes, sizes, configurations, etc.) in order to manage load, optimize operation of the wind turbine, reduce sound or acoustics emitted due to the deployment of the air deflector and/or modify the tone of sound emitted due to deployment of the air deflector. For instance, air flow over/around an airfoil-shaped blade or device may generate sound or acoustics due to, for instance, turbulence from airflow, flow separation, and the like. Deployment of a conventional air deflector may increase sound. Altering the shape and/or configuration of the air deflector, as discussed herein, may aid in reducing flow issues associated with a conventionally shaped air deflector, thereby reducing sound or acoustics associated with use of the air deflector.

Figure 1:
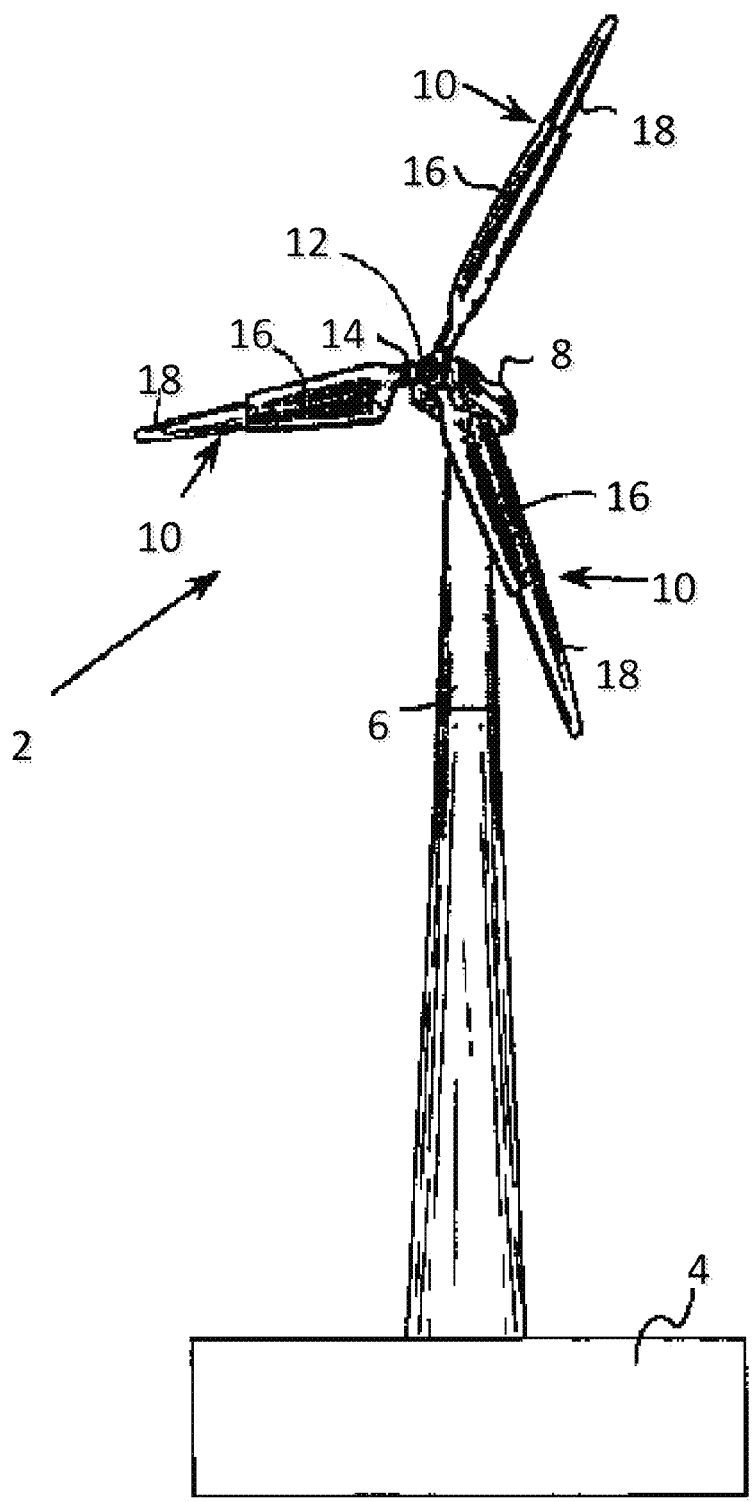
FIG. 1 is a perspective view of an example wind turbine according to one or more aspects described herein.

FIG. 1 shows a wind turbine 2 on a foundation 4 with a tower 6 supporting a nacelle 8. One or more blades 10 are attached to a hub 12 via a bolt flange 14. In the depicted embodiment, the wind turbine includes three blades 10. The hub 12 is connected to a gear box, a generator, and other components within the nacelle 8. The blades 10 may have a fixed length or may be of the variable length-type, i.e., telescopic, such as shown in FIG. 1. As shown in FIG. 1, each variable length blade 10 includes a root or base portion 16 and a tip portion 18. The tip portion 18 is movable with respect to the root portion 16 so as to controllably increase and decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 18 with respect to the root portion 16. Such drive systems are described in U.S. Pat. No. 6,902,370, which is hereby incorporated by reference. The wind turbine 2 further includes a yaw drive and a yaw motor, not shown.

FIGS. 2-5 show a cross section of a wind turbine blade 10 containing at least one load compensating device 30, which may include an air deflector. The blade 10 has a leading edge 20, a trailing edge 22, a high pressure side 24 and a low pressure side 26. A chord line c can be defined as a line between the leading edge 20 and trailing edge 22 of the blade 10. It is recognized that the leading side of the rotor blade 10 corresponds to the leading half of the rotor blade 10 and the trailing side of the rotor blade 10 to the trailing half of the rotor blade 10.

The blade 10 depicted in the figures is merely one illustrative cross-sectional design or airfoil geometry and it is recognized that infinite cross-sectional variations can be used as part of the present invention. The airfoil rotor blade may be made of any suitable construction and materials, such as fiberglass and/or carbon fiber.

Figure 2:
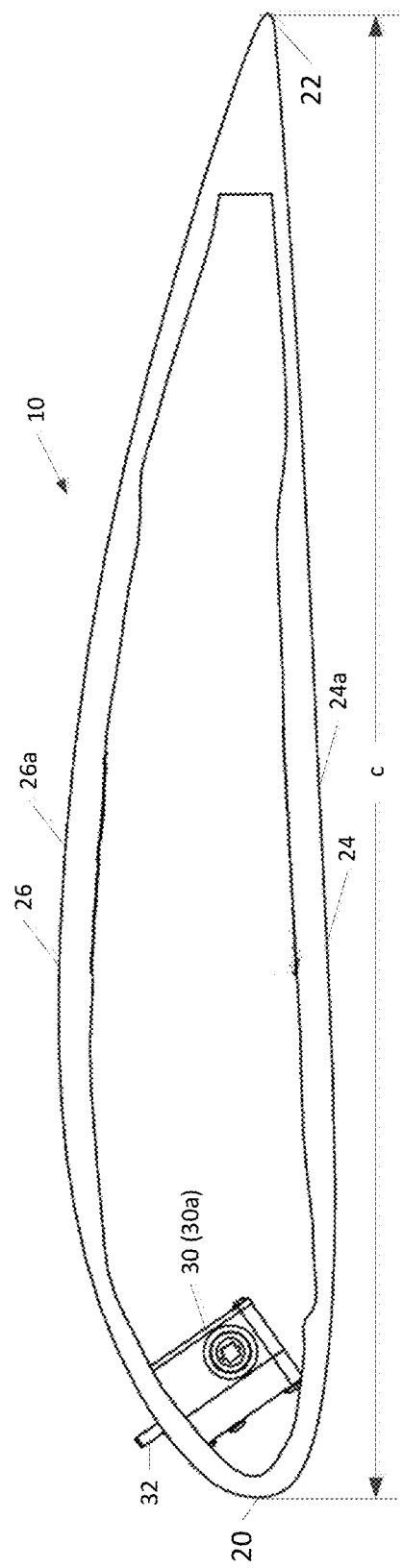
FIG. 2 is a cross-section through an example rotor blade depicting a first load compensating device with the air deflector in an extended position according to one or more aspects described herein.
Figure 3:
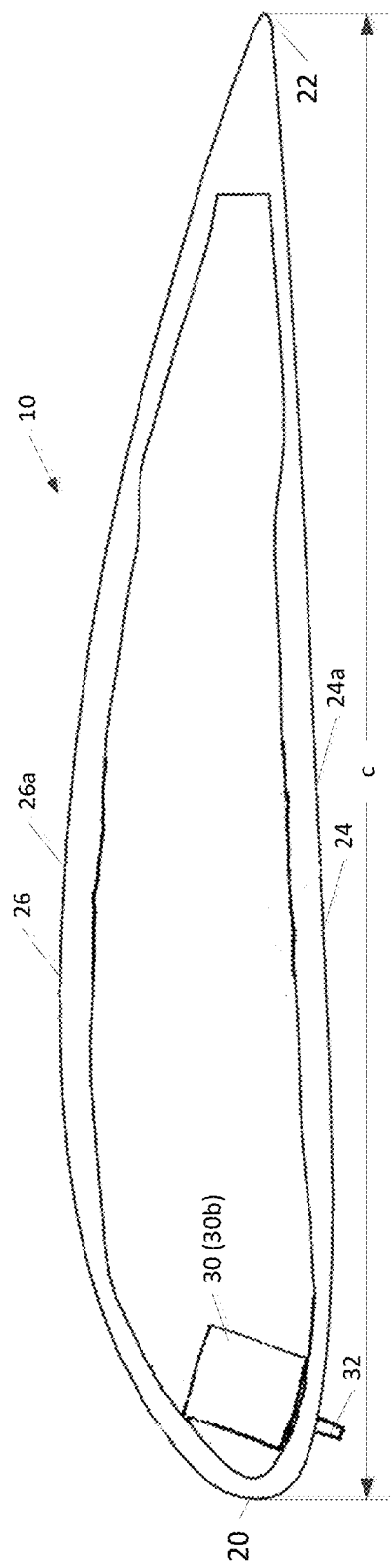
FIG. 3 is a cross-section through an example rotor blade depicting a second load compensating device with the air deflector in an extended position according to one or more aspects described herein.

As can be seen in cross sections of FIGS. 2 and 3, the rotor blade 10 further includes at least one load compensating device, generically referenced as reference number 30, but specifically referred to as reference number 30a and 30b with reference to a specific side of the rotor blade 10. FIG. 2 depicts a placement of a first load compensating device 30a to affect the airflow on the low pressure side 26 of the rotor blade 10. FIG. 3 depicts a placement of a second wind load compensating device 30b to affect the airflow on the high pressure side 24 of the rotor blade 10. It is recognized that in use, the more curved surface 26a and the opposing less curved surface 24a create the dynamics of the low pressure side 26 and the high pressure side 24 due to well known principles of aerodynamics. This, in combination with the airflow over the rotor blade 10, creates an effect known as "lift" that assists in the rotation of the rotor.

In one embodiment, each rotor blade 10 includes at least one first wind load compensating device 30a to affect the airflow on the low pressure side 26 and at least one second wind load compensating device 30b to affect the airflow on the high pressure side 24. That is, it includes wind load compensating devices 30a and 30b, and these devices 30a, 30b may be longitudinally spaced along the rotor blade 10. Any desired number of these devices 30a, 30b may be used. In another embodiment, each rotor blade 10 includes at least one wind load compensating device 30a to affect the airflow on the low pressure side 26 and no wind load compensating devices on the high pressure side 24. Any desired number of the devices 30a may be used on the low pressure side 26. In yet another embodiment, each rotor blade 10 includes at least one wind load compensating device 30b on the high pressure side 24 and no wind load compensating devices on the low pressure side 26. Any desired number of the devices 30b may be used on the high pressure side 24.

Figure 4:
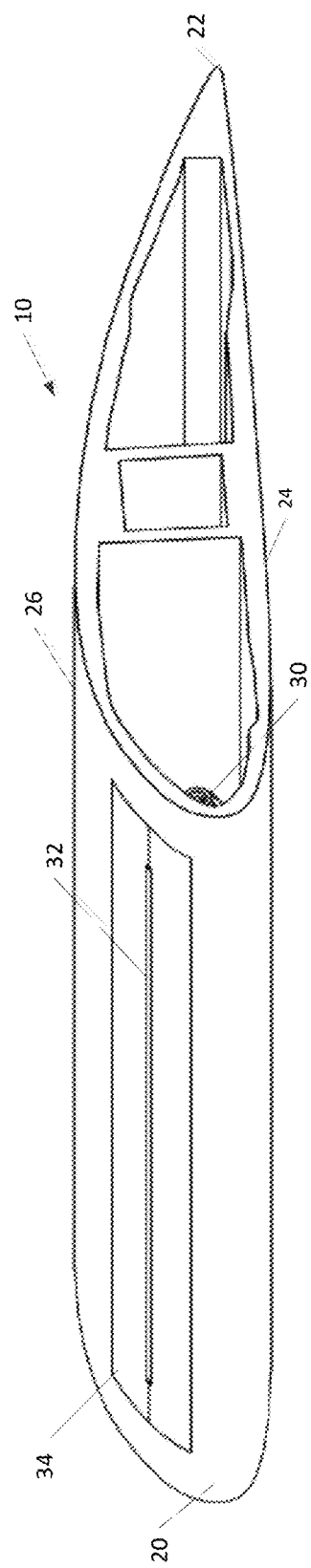
FIGS. 4 and 5 are isometric sectional views through an example rotor blade depicting the load compensating device of FIG. 2 with the air deflector in a retracted position (FIG. 4) and in an extended position (FIG. 5) according to one or more aspects described herein.
Figure 5:
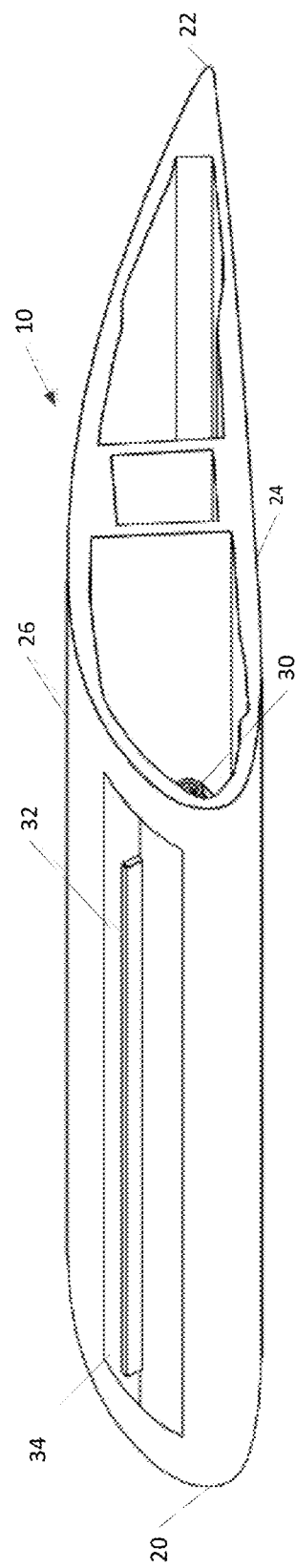

Each wind load compensating device 30a, 30b includes an air deflector 32. Although the air deflector 32 shown may have a generally rectangular configuration (as shown in FIGS. 4 and 5), the air deflector 32 is merely one example configuration used to describe the operation of the air deflector 32. Any of the air deflector shapes, sizes and/or configurations described herein may be used with the load compensating device and/or various other aspects of the disclosure without departing from the invention.

In some examples, the air deflector 32 may be movable between an extended position in which the air deflector 32 extends from an exterior surface of the airfoil rotor blade 10 and a retracted position in which the air deflector 32 is substantially flush with, recessed, or otherwise does not materially extend from the exterior surface of the airfoil rotor blade 10. FIGS. 2 and 3 both show the air deflector 32 in an extended position wherein the air deflector 32 extends from the exterior surface of the rotor blade 10. FIG. 4 is an isometric sectional view through the rotor blade 10 depicting the wind load compensating device 30a in its retracted position. In some examples, the air deflector 32 might not be retractable and, instead, may be fixed in an extended position, protruding outward from the airfoil rotor blade 10.

The various air deflectors described herein may be arranged at any position along the airfoil-shaped blade or airfoil shaped device. For instance, the air deflectors may be arranged at any position or location between a leading edge and trailing edge of the blade, on either a pressure side of the blade or a suction side of the blade.

The air deflector 32, as well as the various other air deflectors shown and described herein with reference to FIGS. 6-23, may be sized based on the desired wind turbine condition parameter and further in view of the number of load compensating devices used. The air deflectors described herein may be made from any suitable material, such as fiberglass, carbon fiber, stainless steel, plastic (such as polycarbonate), and/or aluminum or other lightweight metal. The air deflectors described herein may be of any desired width, for example from a few inches to over a foot. Additionally, air deflectors described herein may extend from the airfoil surface to any desired height, e.g., from less than a percent to a few percent of the chord c (FIG. 3), and they may have any suitable thickness based on the material chosen, typically less than one inch.

FIGS. 4 and 5 are isometric sectional views through the rotor blade 10 depicting the low pressure side wind load compensating device 30 with the air deflector 32 in a retracted position (FIG. 4) and in an extended position (FIG. 5). The wind load compensating device 30 is suitably mounted by an interface to substantially maintain the surface contour the rotor blade 10. That is, the load compensating device may be mounted at any location along an airfoil rotor blade. Various features of load control devices and the operation of one or more load control devices may be found in U.S. Pat. No. 8,267,654, which is incorporated herein by reference. Various mounting arrangements, and interface arrangements will be discussed more fully below.

The use of air deflectors, such as air deflector 32, may aid in managing loads and/or optimizing operation of, for example, a wind turbine. Minimizing sound or acoustics associated with features of a wind turbine is advantageous. Accordingly, various air deflector arrangements described herein aid in reducing load and reducing sound or acoustics generated by an air deflector.

In some examples, reducing load associated with a deployed air deflector may include use of air deflectors 32 having various shapes and/or configurations that may aid in reducing sound. For instance, the air deflector 32 illustrated in FIGS. 2-4 is generally rectangular in shape. However, various other shapes and/or configurations of air deflector may be used without departing from the invention, in order to reduce loads as well as reduce sound associated with the deployed air deflector.

Figure 6:
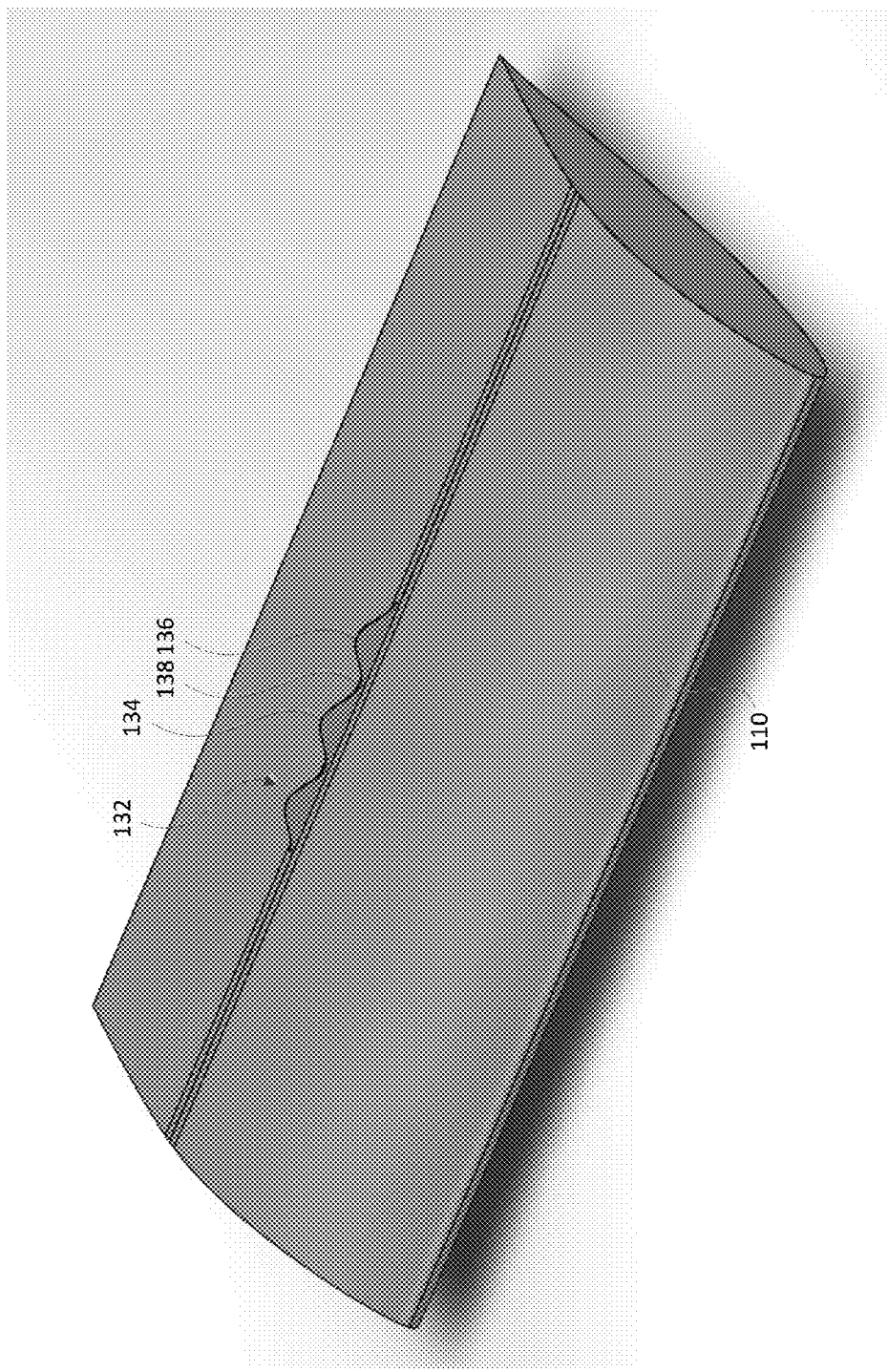
FIG. 6 is a perspective view illustrating a rotor blade including one example air deflector configuration according to one or more aspects described herein.
Figure 7:
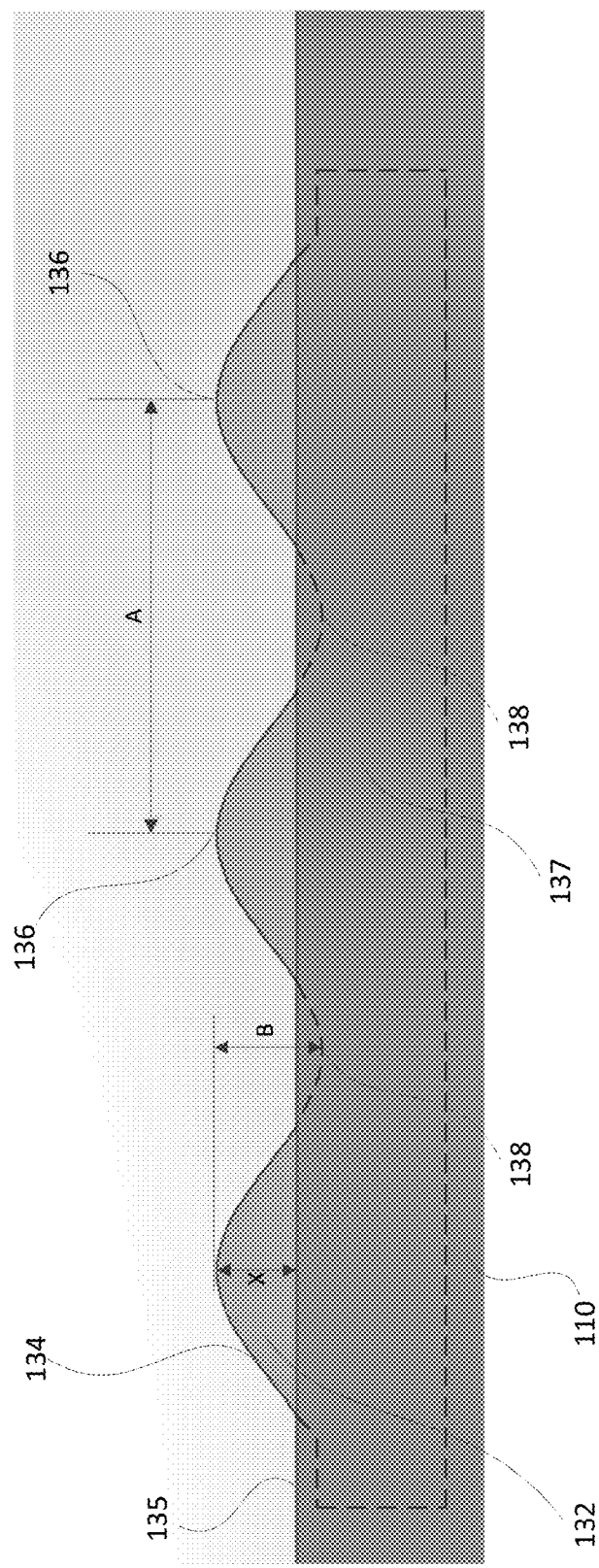
FIG. 7 is an enlarged plan view of the example air deflector of FIG. 6 according to one or more aspects described herein.

For instance, FIGS. 6 and 7 illustrate a rotor blade 110 having one example air deflector arrangement. The rotor blade 110 (shown in these figures and shown and described throughout the description) may be used in a variety of applications. For simplicity, the rotor blade 110 will be described herein as being associated with a wind turbine, such as wind turbine 2 in FIG. 1. The rotor blade 110 includes an air deflector 132. Air deflector 132 is shown in an extended position (e.g., protruding outward from a surface of the rotor blade 110). In some examples, the air deflector 132 may be retracted so that it is flush with, recessed within, or otherwise aligned with the surface of the rotor blade (similar to the arrangement shown in FIG. 4) and deployed as desired or needed (e.g., based on environmental conditions, usage conditions, and the like).

The air deflector 132 includes a first or upper portion including a scalloped edge 134 and a second or lower portion 137 that is substantially rectangular (shown in broken in FIG. 7). Although the air deflector 132 includes three scallops along scalloped edge 134, more or fewer scallops may be included without departing from the invention. For instance, a distance A between adjacent crests 136 of each scallop may be adjusted (e.g., increased or decreased) to alter the number of scallops arranged on the air deflector 132. Additionally or alternatively, the width of the air deflector 132 may be greater or smaller and the number of scallops may be adjusted accordingly.

Further, the scallops may be taller (e.g., the distance B from crest 136 to trough 138 may be greater) or the scallops may be shorter (e.g., the distance B from crest 136 to trough 138 may be smaller) as desired.

In one example arrangement, a value representing the distance A between the crests 136 of each adjacent scallop may be between 5% and 10% of the chord length. Values representing the distance B between a crest 136 of a scallop and a trough 138 of the scallop may be between 0.5% and 5% of the chord length.

Although the air deflector 132 is shown extending outward or protruding from the blade surface 135, in some examples, the air deflector 132 may be deployed to various heights, as desired. A height of deployment of the air deflector may be a distance between a surface of a wind turbine blade (such as surface 135 in FIG. 7) and a point along the air deflector more distal the surface of the wind turbine blade (e.g., the top most portion or surface of the air deflector). One example height, X, is shown in FIG. 7.

The air deflector 132 shown in FIG. 6 may depict the air deflector 132 fully deployed or the air deflector may be shown as partially deployed (e.g., the air deflector may be further extended, as desired). For instance, FIG. 7 illustrates an arrangement in which the trough 138 of the scallops (shown in broken) is not visible above the surface 135 of the rotor blade 110. Accordingly, the air deflector 132 may be further extended such that the entire scallop (e.g., from crest 136 to trough 138) extends outward from a surface of the rotor blade 110.

Figure 8:
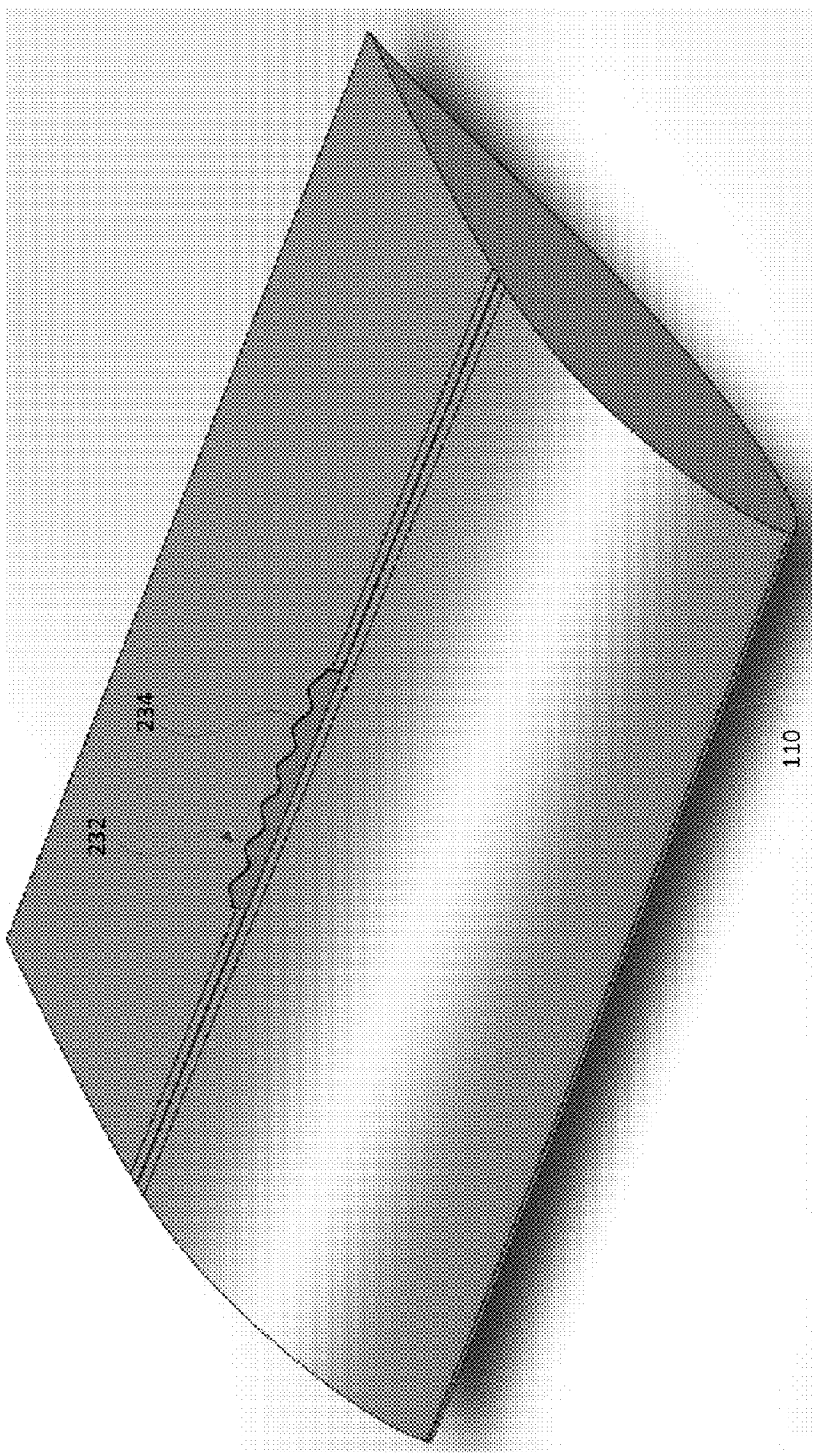
FIG. 8 is a perspective view illustrating a rotor blade including another example air deflector configuration according to one or more aspects described herein.
Figure 9:
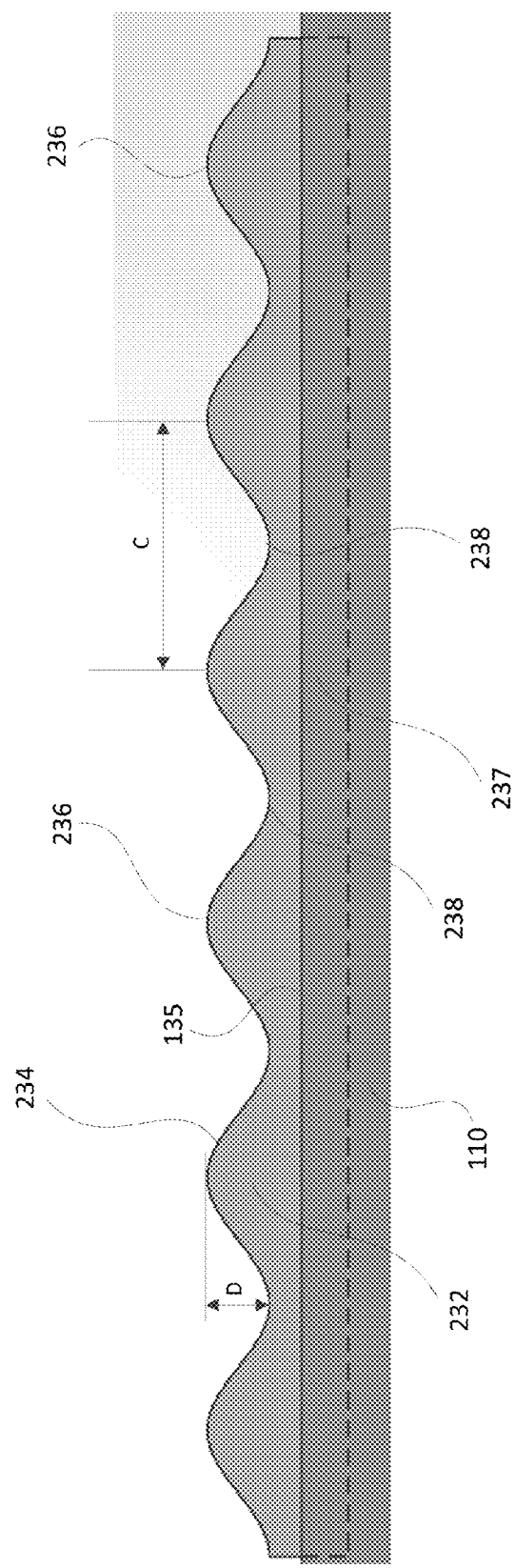
FIG. 9 is an enlarged plan view of the air deflector of FIG. 8 according to one or more aspects described herein.
Figure 10:
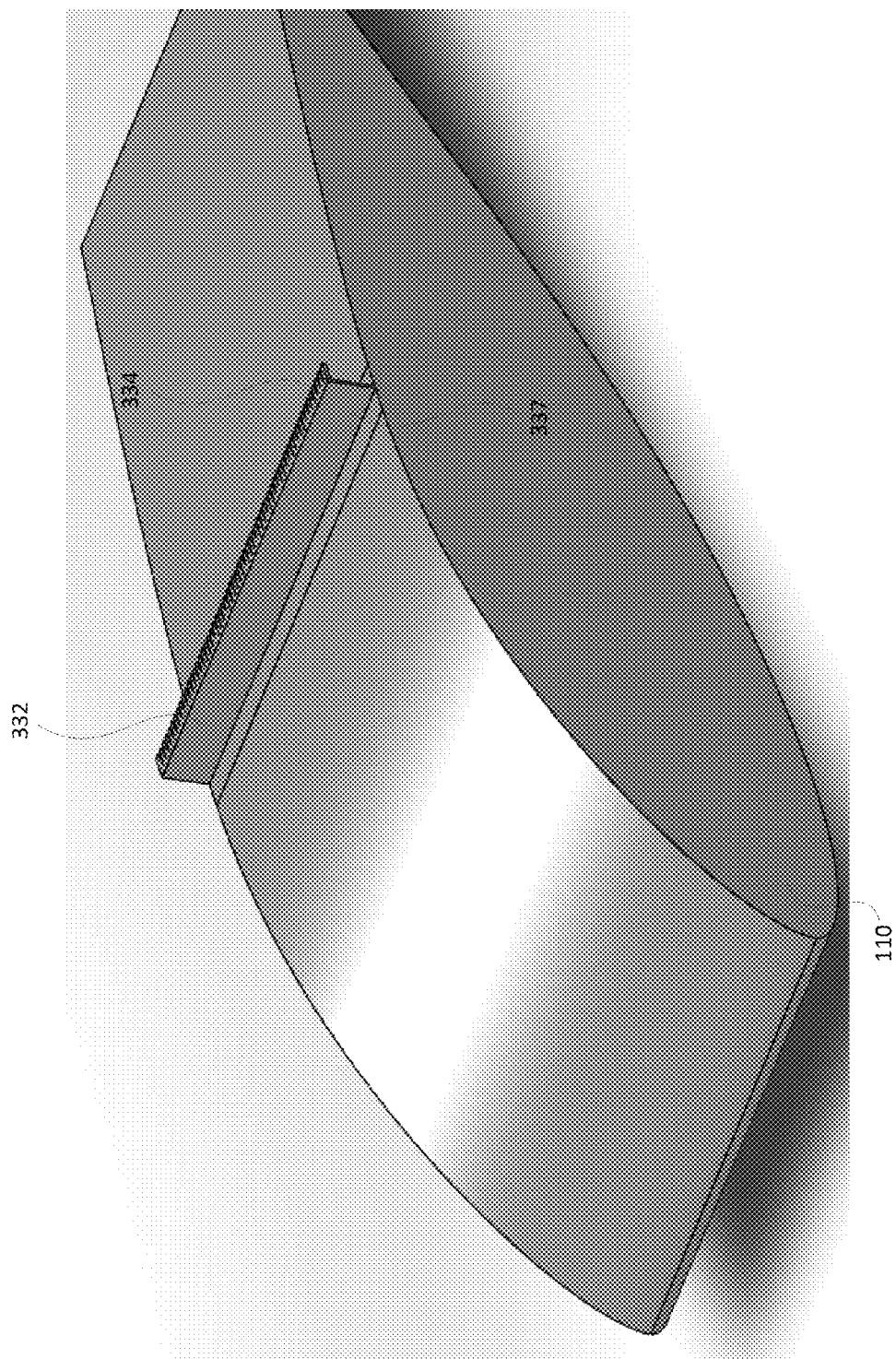
FIG. 10 is a perspective view of a rotor blade including yet another example air deflector configuration according to one or more aspects described herein.

FIGS. 8 and 9 illustrate a rotor blade 110 having another example air deflector arrangement. The rotor blade 110 includes an air deflector 232. Air deflector 232 is shown in an extended position (e.g., protruding outward from a surface of the rotor blade 110). In some examples, the air deflector 232 may be retracted so that it is flush with, recessed within, or otherwise aligned with the surface 135 of the rotor blade (similar to the arrangement shown in FIG. 4) and deployed as desired or needed (e.g., based on environmental conditions, usage conditions, and the like).

Similar to the arrangement in FIGS. 6 and 7, the air deflector 232 includes a first or upper portion including a scalloped edge 234 and a second or lower portion 237 that is substantially rectangular (shown in broken in FIG. 9). Although the air deflector 232 includes six scallops along scalloped edge 234, more or fewer scallops may be included without departing from the invention. For instance, a distance C between adjacent crests 236 of each scallop may be adjusted (e.g., increased or decreased) to alter the number of scallops arranged on the air deflector 232. Additionally or alternatively, the width of the air deflector 232 may be greater or smaller and the number of scallops may be adjusted accordingly.

Further, the scallops may be taller (e.g., the distance D from crest 236 to trough 238 may be greater) or the scallops may be shorter (e.g., the distance D from crest 236 to trough 238 may be smaller) as desired.

In one example arrangement, a value representing the distance C between the crests 236 of each adjacent scallop may be between 0.5% and 5% of the chord length. Values representing the distance D between a crest 236 of a scallop and a trough 238 of the scallop may be between 0.25% and 2.5% of the chord length.

The air deflector 232 is depicted in an extended or at least partially extended position. The extended position includes the scalloped edge 234 protruding outward from a surface 135 of the rotor blade 110. Unlike the arrangement in FIGS. 6 and 7, the full scallop (e.g., both the crest 236 and trough 238 of each scallop) is visible on an exterior of the rotor blade 110 (e.g., protrudes outward from the surface 235 of the rotor blade 110). Further, at least a portion of the second, lower portion 237 also extends outward from the surface 135 of the rotor blade. This arrangement may provide different aerodynamic characteristics from the similar scalloped arrangement shown in FIGS. 6 and 7, thereby modifying the sound or acoustic signature of the rotor blade 110 and air deflector 232.

Although the air deflector 232 is shown extending outward or protruding from the blade surface 135, in some examples, the air deflector 232 may be deployed to various heights, as desired. For instance, the air deflector 232 shown in FIGS. 8 and 9 may depict the air deflector 232 fully deployed or the air deflector 232 may be shown as partially deployed (e.g., the air deflector may be further extended, as desired). For instance, an additional portion of the second, lower portion 237 may be extended upward, above or outward from the surface 235 of the rotor blade, thereby increasing the overall height of the air deflector 232 above the surface 135.

FIGS. 10 and 11A-11D illustrate another example air deflector 332 arranged on the rotor blade 110. The air deflector 332 shown in FIGS. 10 and 11A-11D includes a substantially L-shaped configuration. That is, the air deflector 332 includes a first, substantially rectangular, main portion 337 and a second, serrated portion 334, positioned vertically above the first, main portion 337. The second, serrated portion 334 may extend perpendicularly, or substantially perpendicularly, from a first end or edge 340 of the substantially rectangular main portion 337. The serrated portion 334 includes a plurality of teeth 350 that may have various configurations, as shown in FIGS. 11A-11D.

Figure 11B:
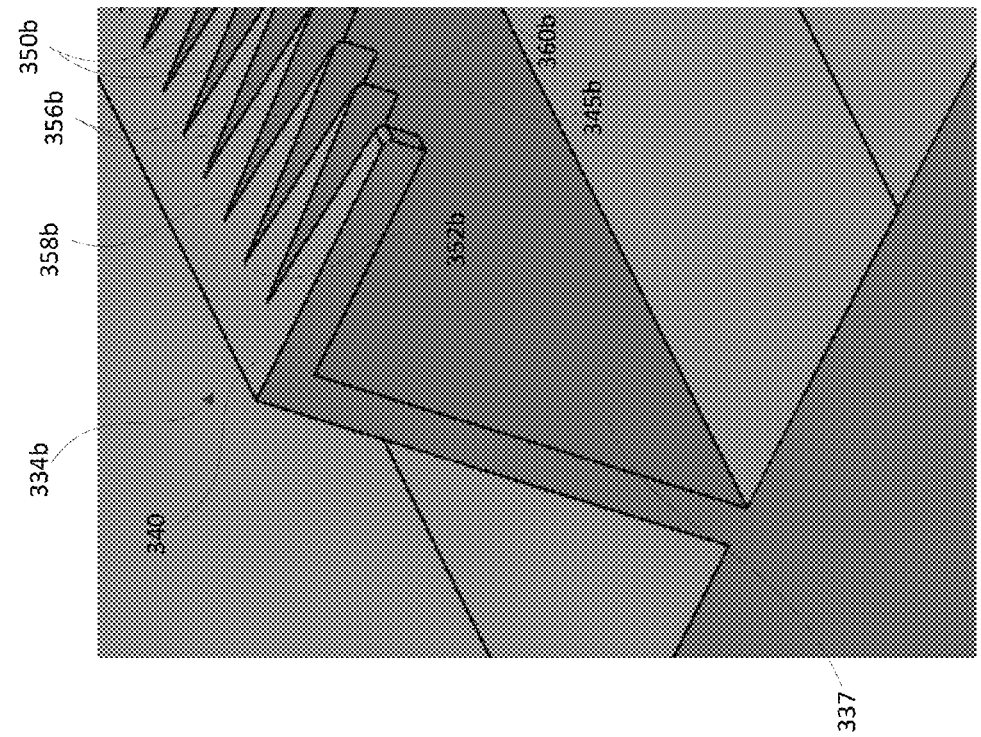
FIGS. 11A-11D are enlarged views of various example air deflector configurations according to one or more aspects described herein.
Figure 11A:
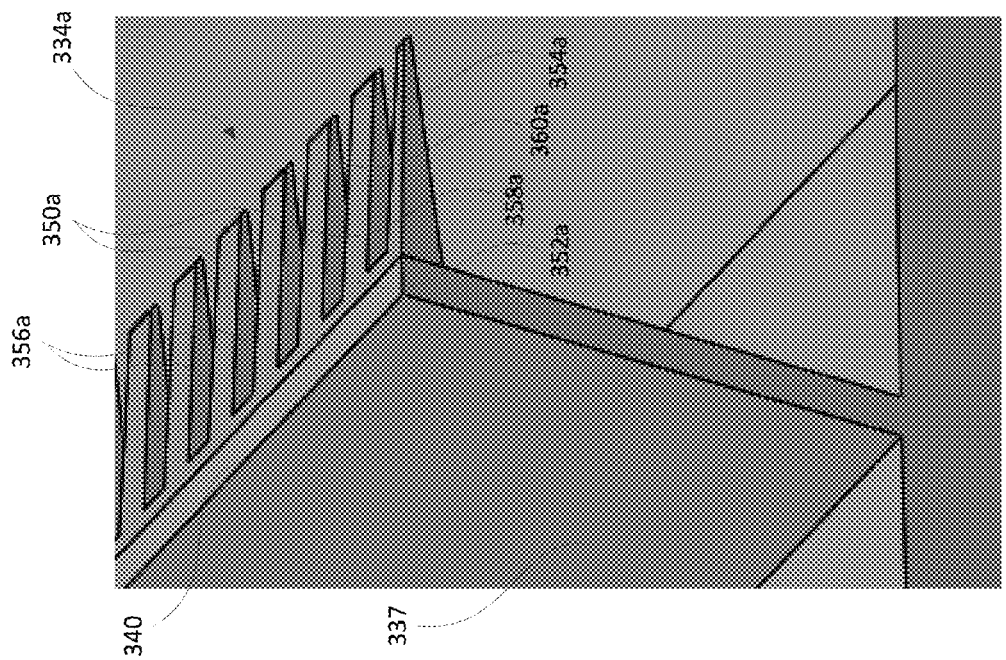

For instance, as shown in FIG. 11A, the serrated portion 334a includes a plurality of teeth 350a having a tapered configuration. That is, the teeth 350a taper downward as each tooth extends from the first end 340 of the main portion 337 outward, away from the main portion 337. Thus, each tooth 350a may be wider at a base 352a (e.g., an end proximal to the main portion 337) than at a tip 354a (e.g., an end distal from the main portion 337).

As shown in FIG. 11A, each tooth 350a tapers downward, such that side surfaces 356a (and opposite side surfaces not shown in FIG. 11A) of the teeth 350a are parallel or substantially parallel, while a top surface 358a and a corresponding bottom surface 360a taper from the wider base 352a to the narrower tip 354a. FIG. 11B includes an alternate configuration having teeth 350b that include a taper. However, the top surface 358b and bottom surface 360b of teeth 350b remain substantially parallel as the tooth 350b extends outward from the first end 340 while the side surfaces 356b taper inward as the tooth 350b extends from the base 352b to the tip 354b.

Figure 11D:
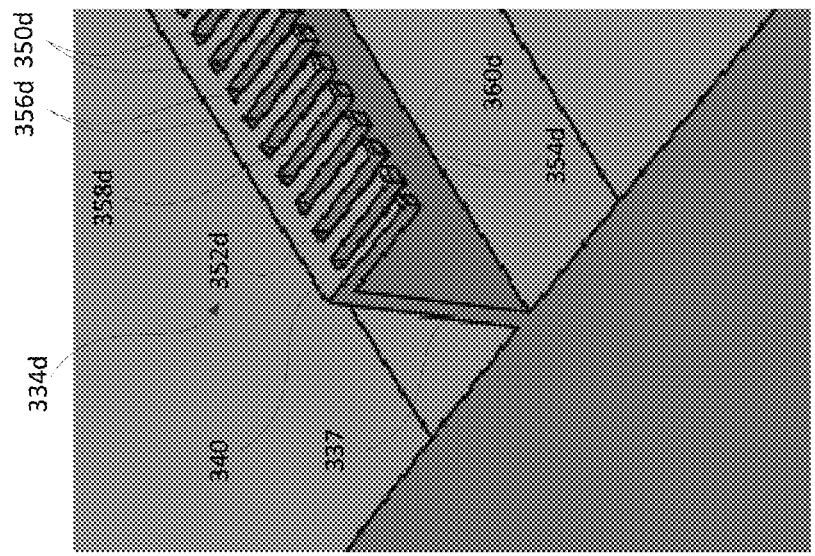
Figure 11C:
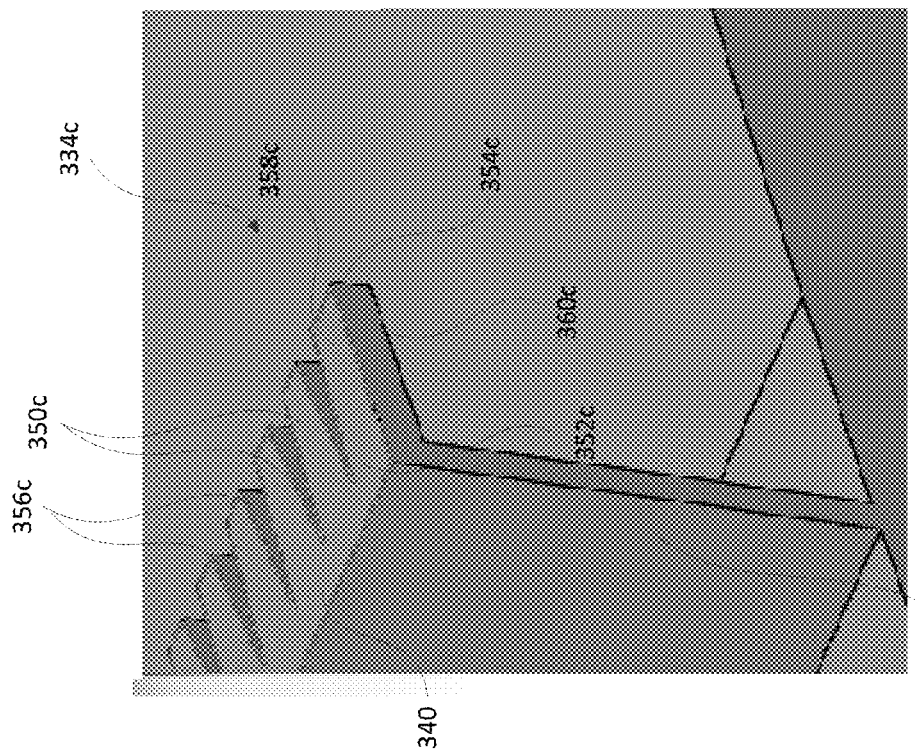

FIG. 11C illustrates yet another serrated arrangement 334c including a plurality of teeth 350c having a tapered configuration. Similar to the arrangement in FIG. 11B, the side surfaces 356c taper inward, toward each other, as the tooth 350c extends outward from the first end 340 of the main portion 337 to the tip 354c, while the top surface 358c and corresponding bottom surface 360c are parallel or substantially parallel. The teeth 350c of FIG. 11C may also have a wider base 352c than the base 352b of teeth 350b in FIG. 11B. Further, the teeth 350c may have less of a taper than other tooth arrangements shown in FIG. 11A, 11B or 11D. For instance, the tip 354c may be wider than other tips, such as 354b in FIG. 11B and/or 354a in FIG. 11A.

FIG. 11D illustrates yet another serrated portion 334d arrangement having a plurality of teeth 350d. The teeth 350d of FIG. 11D are substantially rectangular in shape and have little or no taper, unlike the teeth 350a, 350b, 350c in FIGS. 11A-11C. That is, the teeth 350d have side surfaces 356d (and corresponding opposite sides not shown in FIG. 11D) that are parallel or substantially parallel. Further, top surface 358d and corresponding bottom surface 360d for each tooth 350d may be parallel or substantially parallel.

Although the arrangements shown herein include teeth 350 have a general similar shape and size along a length of the air deflector, combinations of differently sized or shaped teeth may be used without departing from the invention.

The air deflectors 332 including the various different serrated portion arrangements shown and described in FIGS. 11A-11D may reduce loads and may also aid in reducing sound emitted from the rotor blade during use, as is discussed more fully herein.

Figure 12:
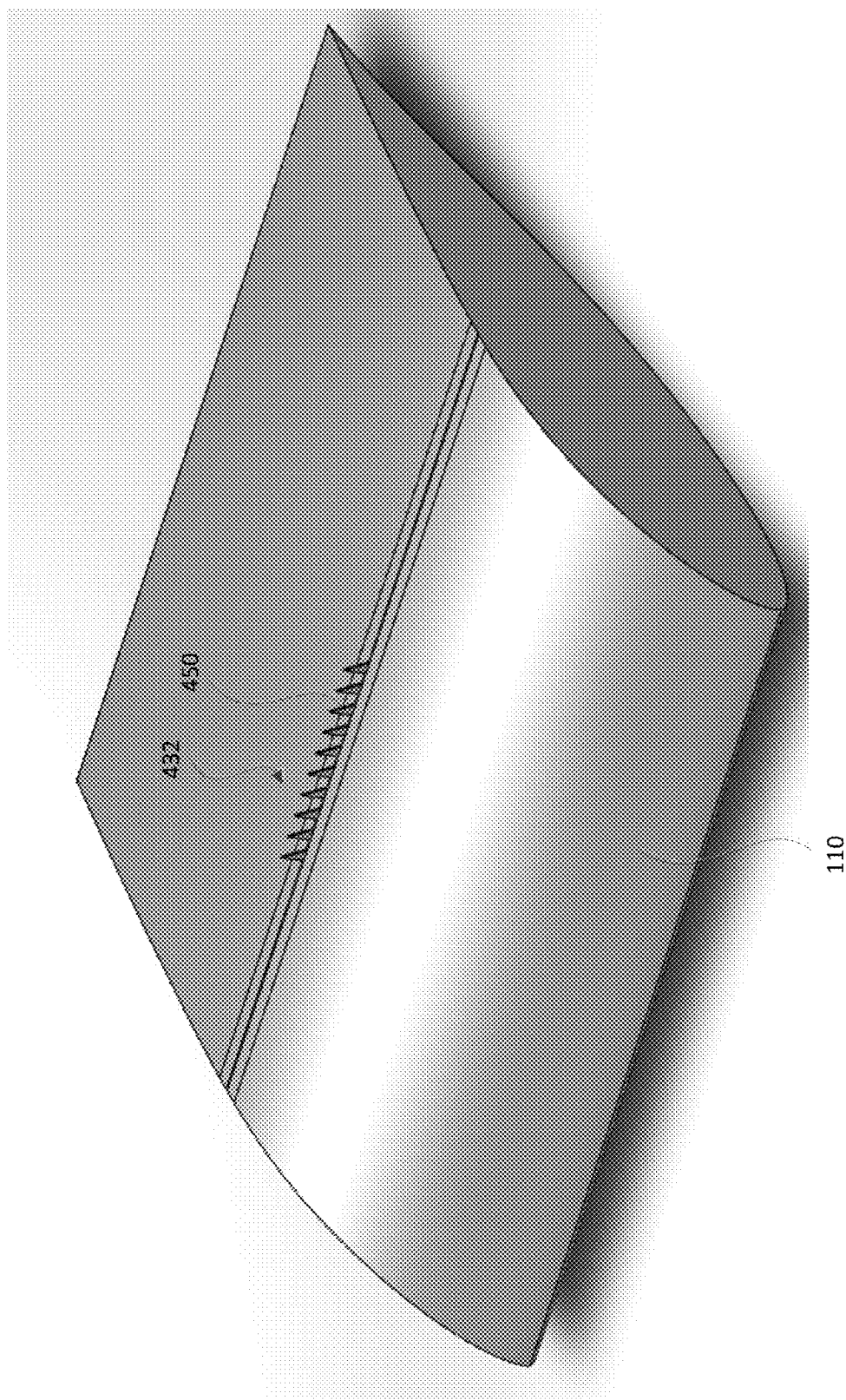
FIG. 12 is a perspective view illustrating a rotor blade including one example air deflector configuration according to one or more aspects described herein.
Figure 13:
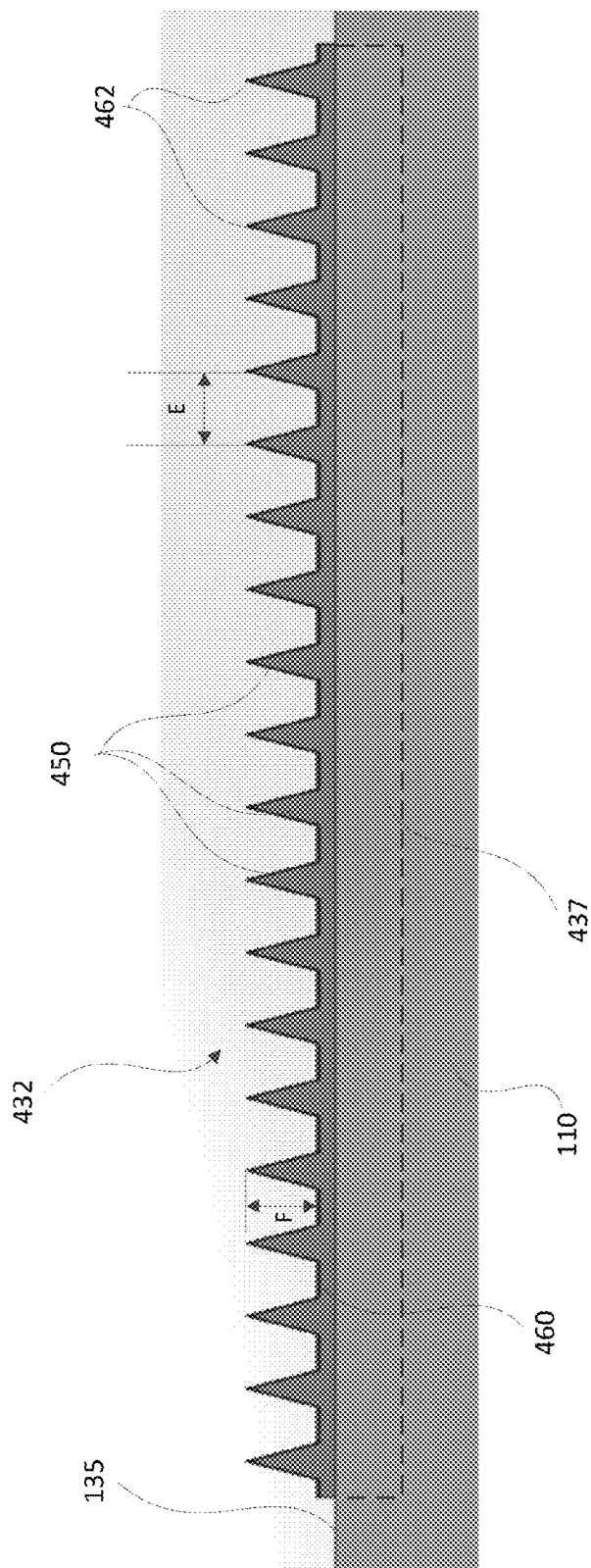
FIG. 13 is an enlarged plan view of the air deflector of FIG. 12 according to one or more aspects described herein.

FIGS. 12 and 13 illustrate yet another rotor blade and air deflector arrangement according to one or more aspects described herein. The rotor blade 110 includes an air deflector 432 having a plurality of teeth 450 extending outward from a surface 135 of the rotor blade 110. The air deflector includes a first, substantially rectangular portion 437 and the teeth 450 are formed on the air deflector 432 in a second, upper portion positioned vertically above the first portion 437. The teeth 450 have a substantially triangular configuration. In some examples, the each tooth may have the shape of an isosceles triangle, in which a base portion is shorter than the other two sides, which are substantially equal in length. In the configuration shown in FIGS. 12 and 13, adjacent teeth 450 have a substantially flat portion 460 between them, such that the sides of each tooth 450 are not abutting (e.g., each tooth 450 is spaced apart from an adjacent tooth). In some examples, that substantially flat portion 460 between adjacent teeth 450 may be between 0.5% and 2% of the chord length.

The number of teeth 450 shown in FIGS. 12 and 13 are merely one example number of teeth 450. More or fewer teeth 450 may be provided on the air deflector 432. For instance, a distance E between tips 462 (e.g., point along a tooth most distal from the surface 435 of the rotor blade 110) may be increased or decreased to adjust a number of teeth 450 arranged along an air deflector. Additionally or alternatively, a height F of the teeth may be adjusted in order to alter the size of the teeth 450.

A value representing the distance E may be between 0.5% and 5% of the chord length, while a value representing the distance F may be between 0.5% and 20% of the chord length.

Similar to other arrangements described herein, the air deflector 432 may be extended outward from the surface 135 of the rotor blade 110 to varying heights. For instance, FIG. 12 shows the air deflector 432 in a partially extended position such that a majority of the height E of the teeth 450 is visible above of the surface 135 of the rotor blade 110. However, in some examples, the air deflector 432 may be extended to an additional height which may, in some arrangements, expose a portion of the second, substantially rectangular portion 437 of the air deflector 437.

Figure 14:
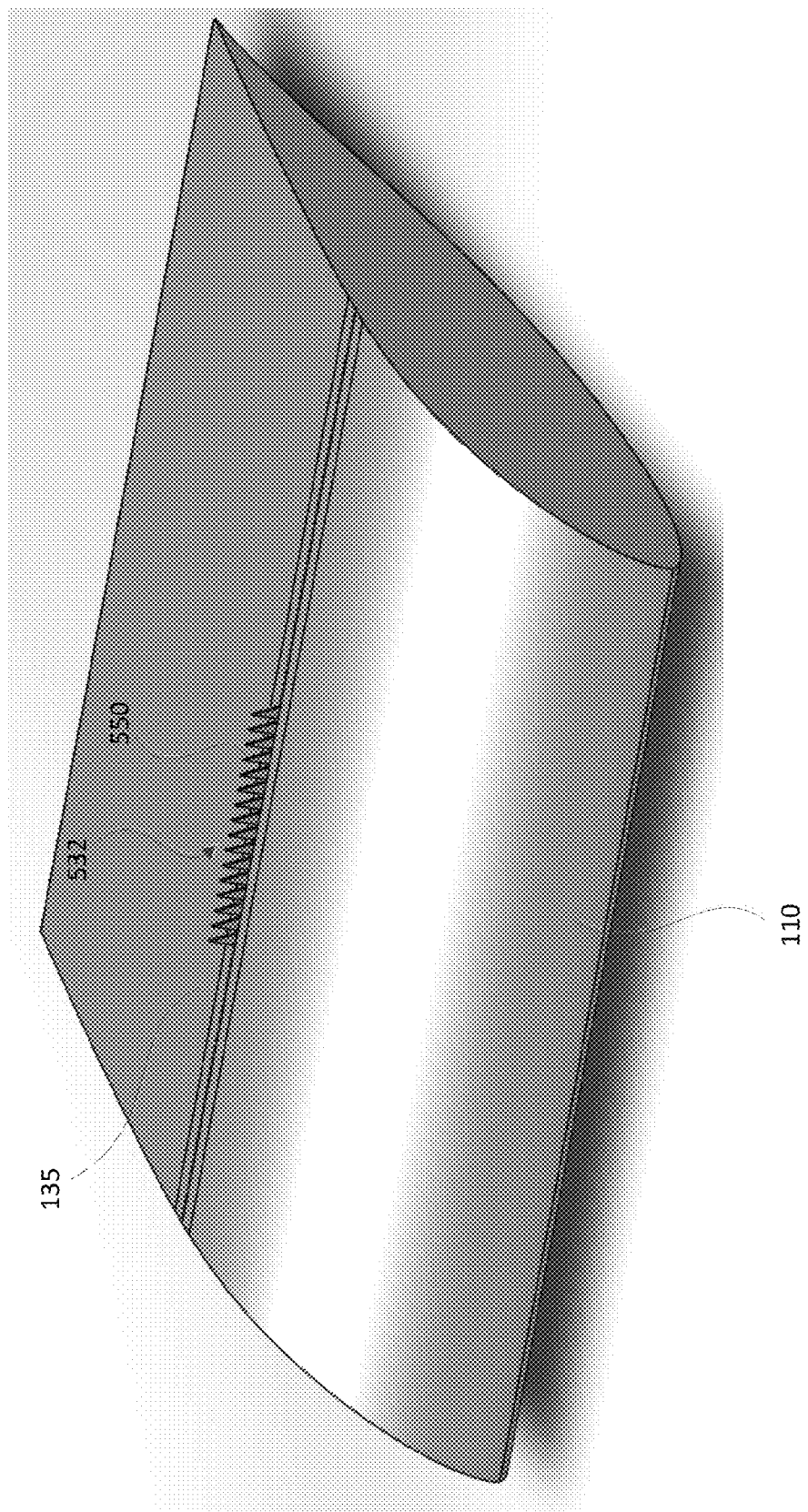
FIG. 14 is a perspective view illustrating a rotor blade including still another example air deflector arrangement according to one or more aspects described herein.

FIG. 14 illustrates another example air deflector 532 arranged on a rotor blade 110. Similar to the arrangement in FIGS. 12 and 13, the air deflector 532 includes a plurality of teeth 550 extending outward from a surface 135 of the rotor blade. The teeth 550 of FIG. 14 are more closely packed than the teeth 450 of FIGS. 12 and 13. That is, the teeth 550 are positioned more closely together than the teeth 450 of FIGS. 12 and 13. In some examples, there may be little or no substantially flat portion (e.g., 460 in FIG. 13) between adjacent teeth 550. That is, in some examples, adjacent teeth 550 may abut each other (e.g., a bottom of one side of one tooth 550 may abut a bottom of one side of another, adjacent tooth 550).

Figure 15:
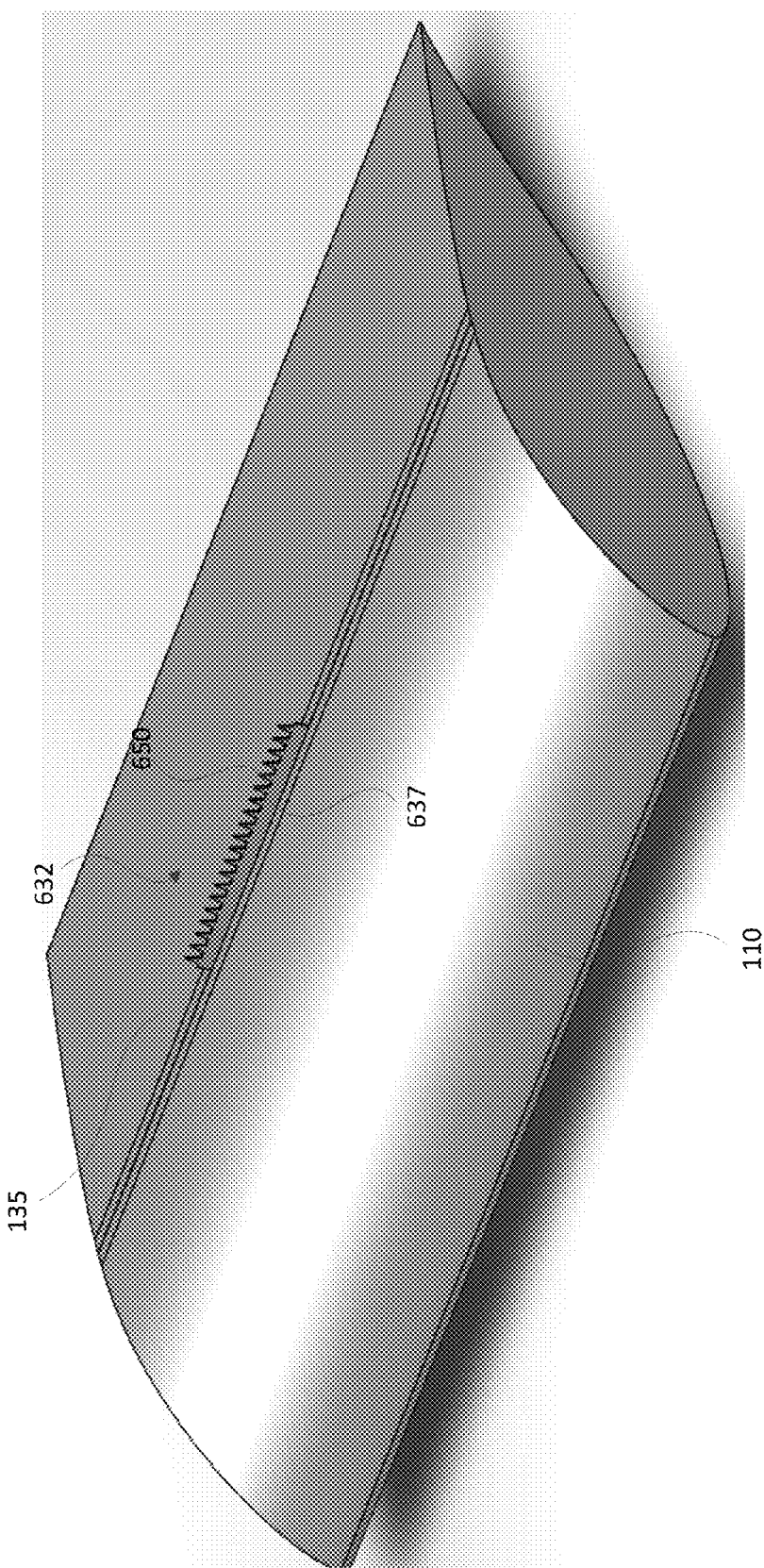
FIG. 15 is a perspective view illustrating a rotor blade including yet another example air deflector arrangement according to one or more aspects described herein.

FIG. 15 illustrates yet another rotor blade 110 including an air deflector 632 according to one or more aspects described herein. Similar to the arrangements of FIGS. 12-14, the air deflector includes a plurality of teeth 650. The air deflector 632 may include a first, substantially rectangular portion 637 and the teeth 650 may be formed on a second, upper portion of air deflector 632 arranged vertically above the first portion 637. As shown in FIG. 15, the air deflector 632 may be extended outward, from the surface 135 of the rotor blade, such that the teeth 650 and at least a portion of the second, substantially rectangular portion 637 are visible above the surface 135 of the rotor blade 110. As discussed herein, the air deflector 632 may be deployed to varying heights which may expose more or less of the second, substantially rectangular portion 637.

Figure 16:
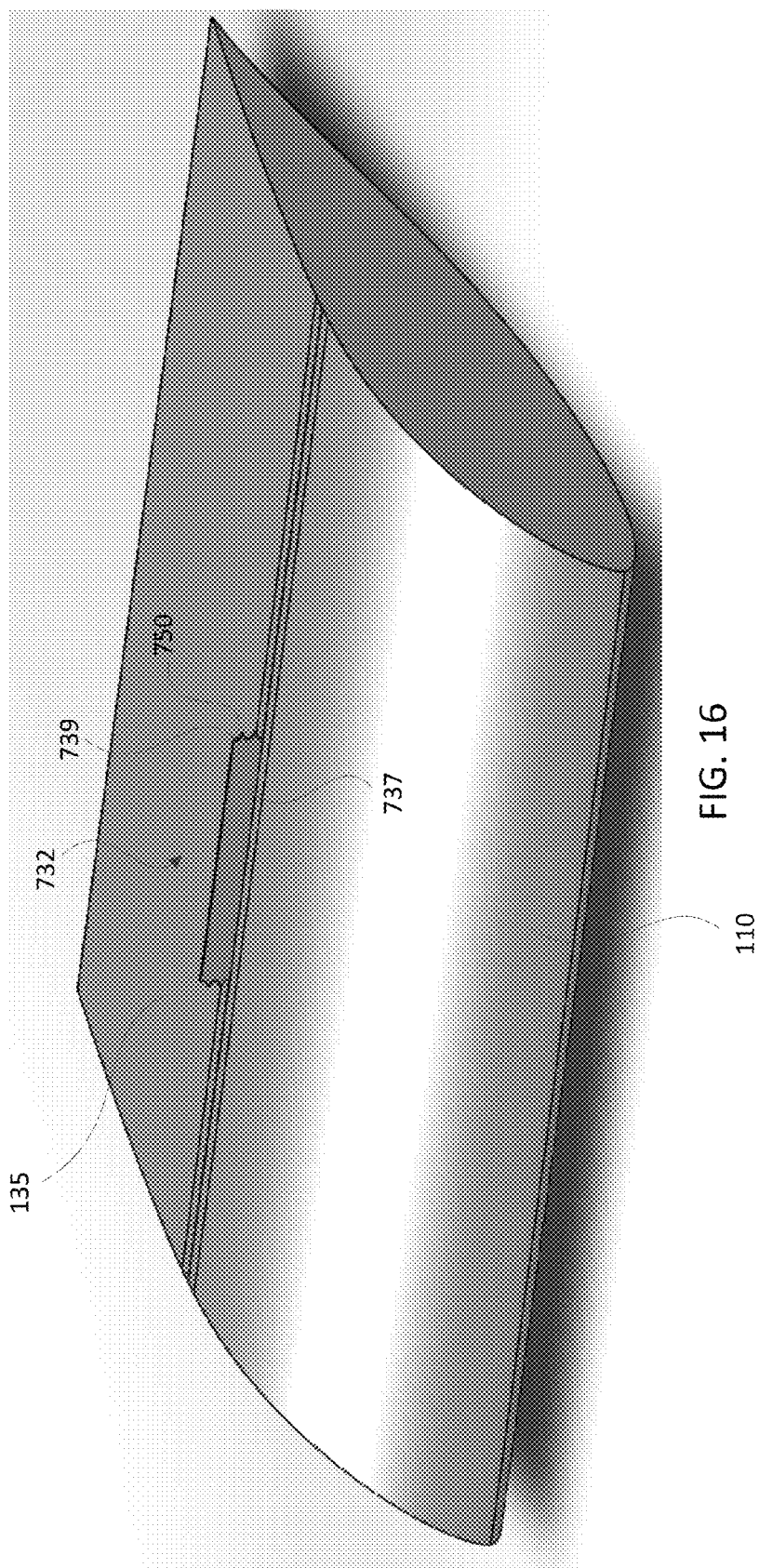
FIG. 16 is a perspective view illustrating a rotor blade including another example air deflector arrangement according to one or more aspects described herein.
Figure 17:
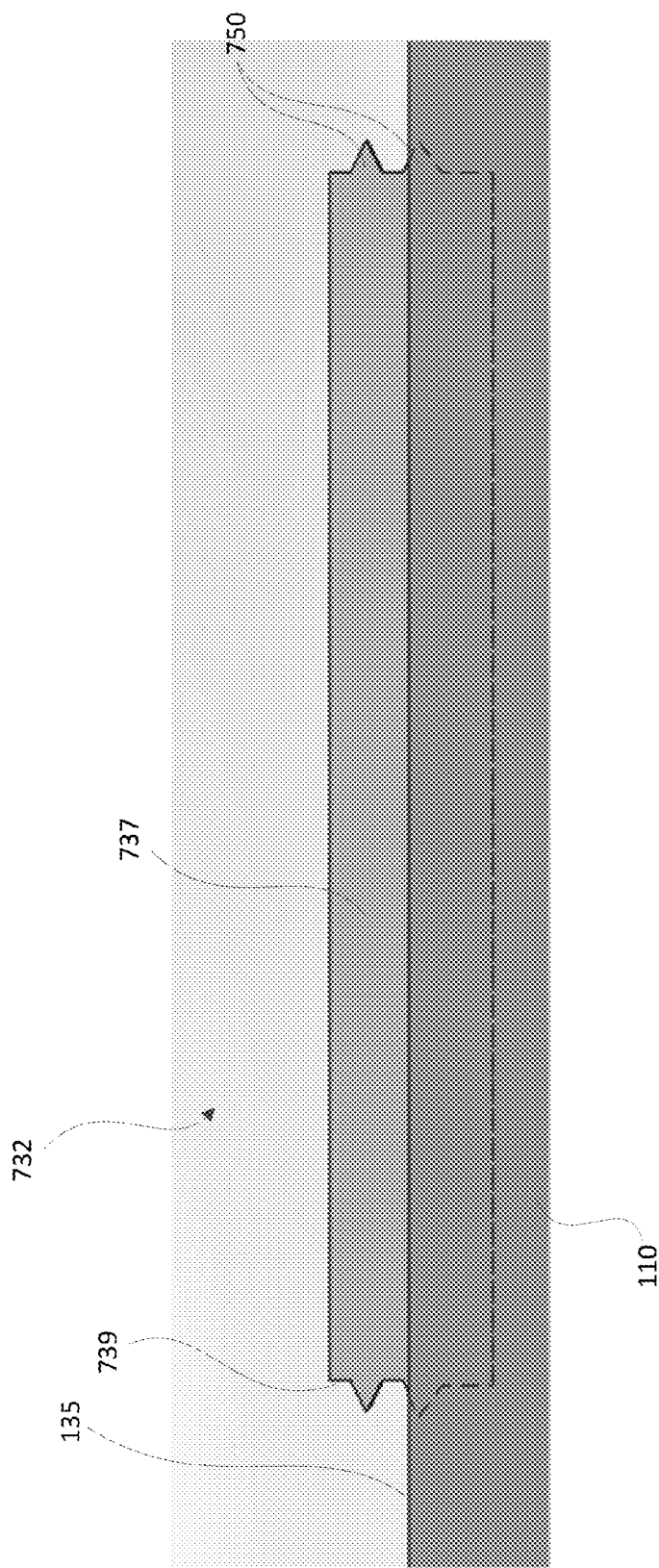
FIG. 17 is an enlarged plan view of the air deflector of FIG. 16 according to one or more aspects described herein.

FIGS. 16 and 17 illustrate a rotor blade 110 having yet another air deflector arrangement or configuration according to one or more aspects described herein. Similar to some arrangements discussed above, the air deflector 732 includes a substantially rectangular portion 737 having a plurality of teeth 750 extending outward therefrom. However, unlike some other arrangements discussed herein, the teeth 750 extend outward from a side surface 739 of the substantially rectangular portion 737, rather than from a top or first end, as shown in, for example, FIGS. 12-15.

Similar to other arrangements described herein, the air deflector may be extended to varying heights. For instance, as shown in FIG. 17, the air deflector 732 may have a portion of the substantially rectangular portion 737 and/or a portion of one or more teeth 750 recessed within the rotor blade (as shown in broken lines) when the air deflector 732 is in a partially extended position (e.g., extended outward, away from the surface 135 of the rotor blade 110). As the air deflector is extended to additional heights, more of the substantially rectangular portion 737 and/or more of the portion of the teeth 750 recessed will be exposed or visible above the surface 135 of the rotor blade 110.

The teeth 750 may be any reasonable size and/or configuration, including various sizes and configurations discussed herein with respect to other arrangements or figures. Further, although two teeth 750 are shown extending from each side surface 739, more or fewer teeth may be used without departing from the invention. Further still, although each side surface 739 includes two teeth 750 in the arrangement of FIGS. 16 and 17, each side surface 739 may have a different number of teeth 750 (e.g., one side may have three teeth while the other has two, one side may have six teeth while the other has four, and the like).

Figure 18:
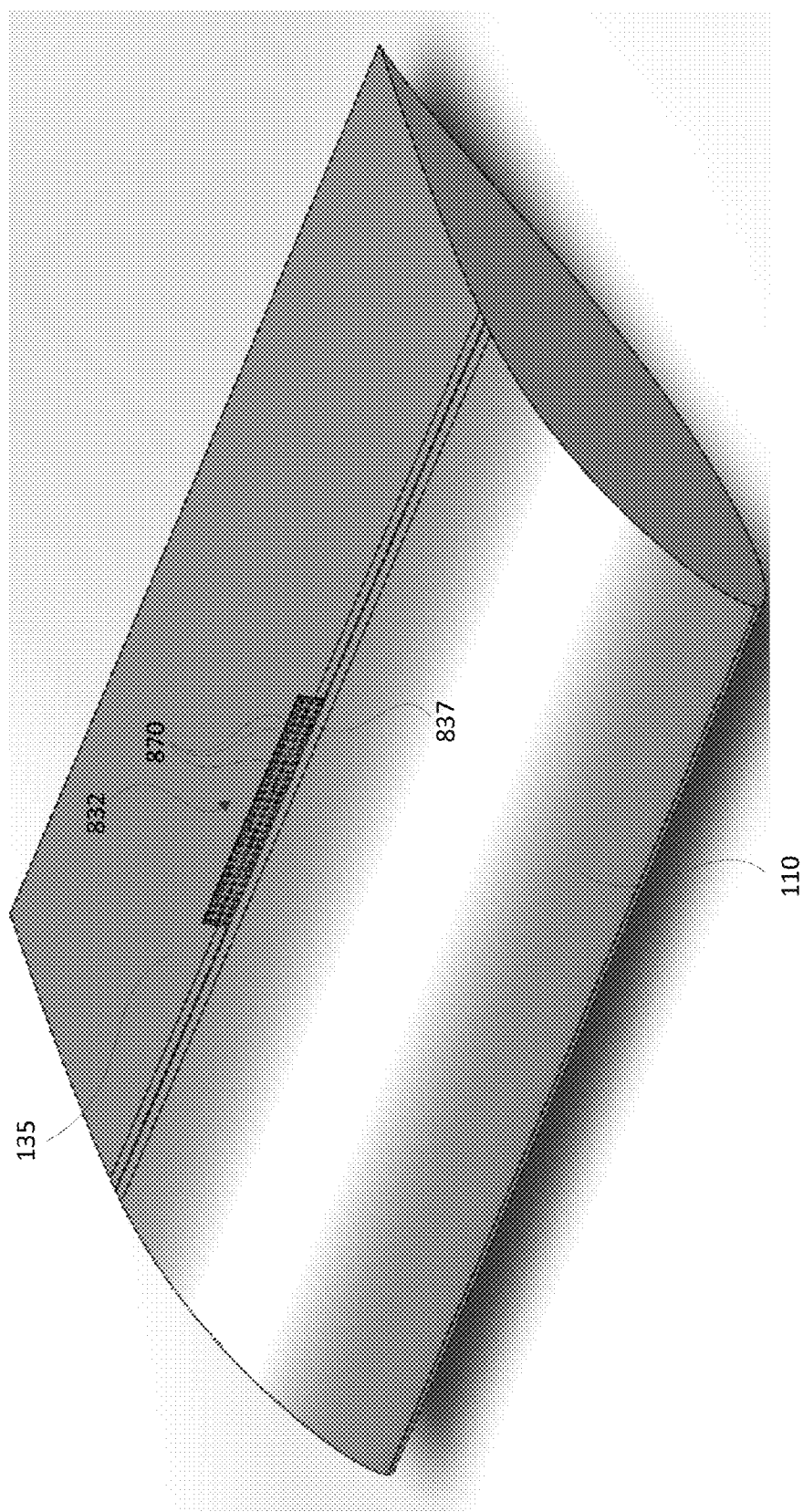
FIG. 18 is a perspective view of an example air deflector configuration according to one or more aspects described herein.

FIGS. 18 and 19 illustrate a rotor blade 110 having still another air deflector configuration or arrangement according to one or more aspects described herein. The air deflector 832 extends outward from a surface 135 of rotor blade 110. Similar to other arrangements discussed above, the air deflector 832 may be deployable to various heights (e.g., higher or lower heights than shown in, for instance, FIG. 18).

The air deflector 832 is rectangular or substantially rectangular in shape and includes a plurality of apertures 870 arranged on the air deflector 832. In at least some arrangements, the apertures 870 extend entirely through the air deflector 832, thereby permitting air to pass through the apertures 870 when the air deflector 832 is deployed during operation.

Figure 24:
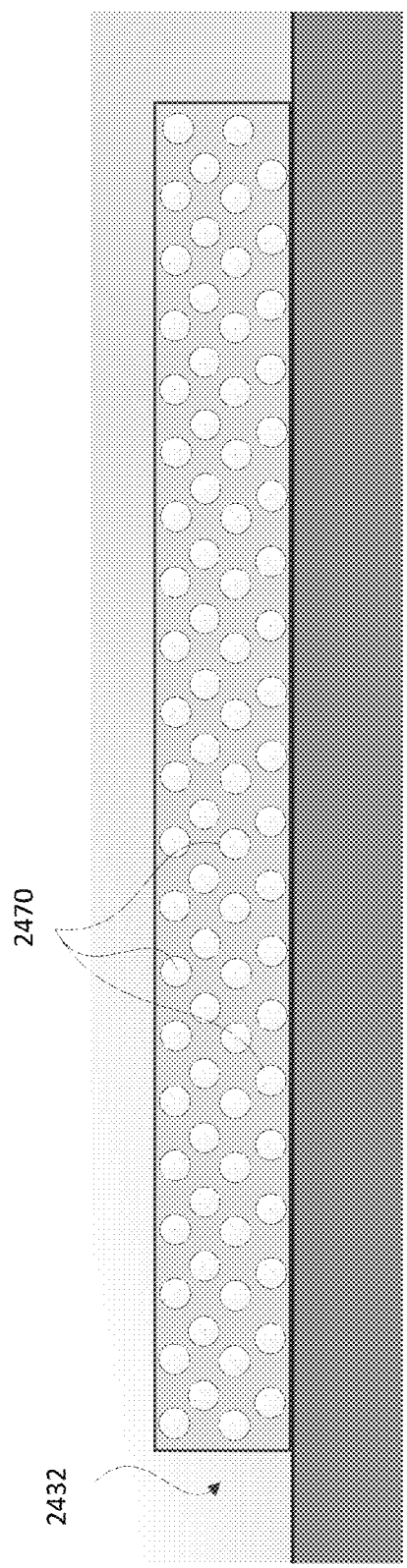
FIG. 24 illustrates another air deflector configuration according to one or more aspects described herein.

The apertures 870 are shown arranged in three rows with each aperture 870 being in vertical and horizontal alignment with adjacent apertures 870. Alternatively, the apertures may be arranged in an offset manner (e.g., adjacent apertures may be offset either horizontally or vertically). One example offset arrangement is shown in FIG. 24 in which air deflector 2432 includes staggered or offset apertures 870. Various other offset arrangements may be used without departing from the invention.

Figure 21:
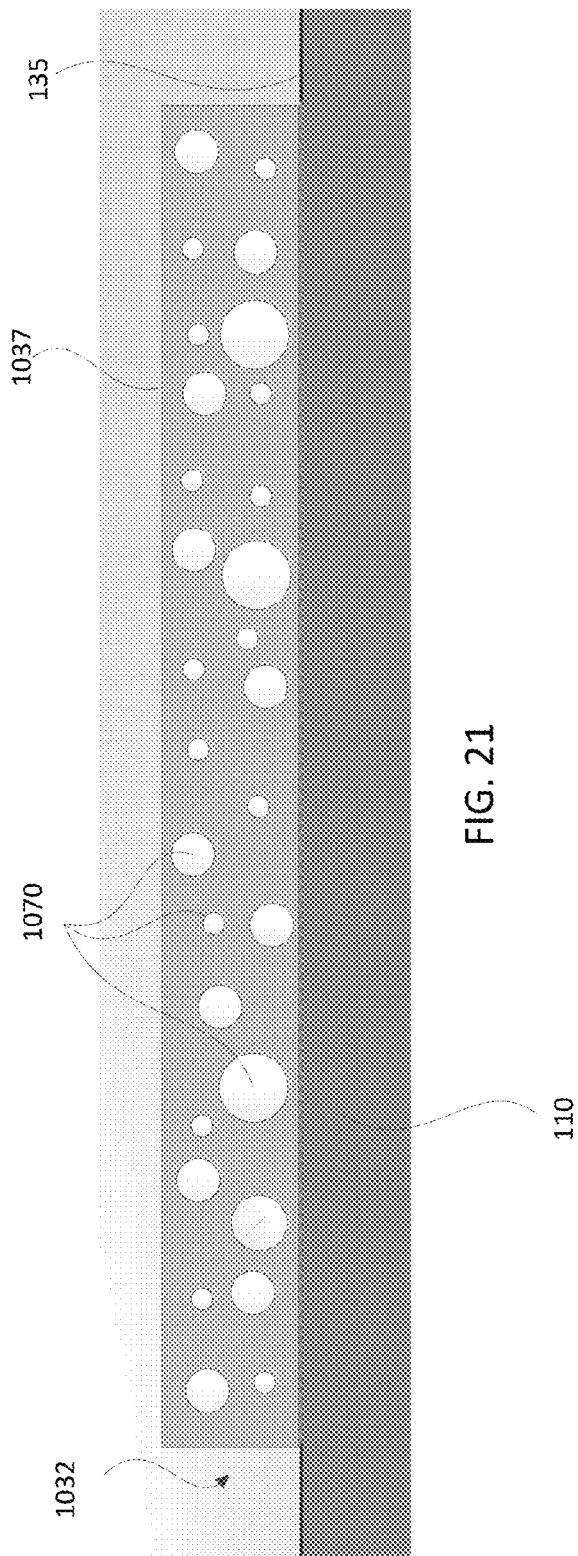
FIG. 21 is an enlarged plan view of an alternate air deflector configuration according to one or more aspects described herein.
Figure 22:
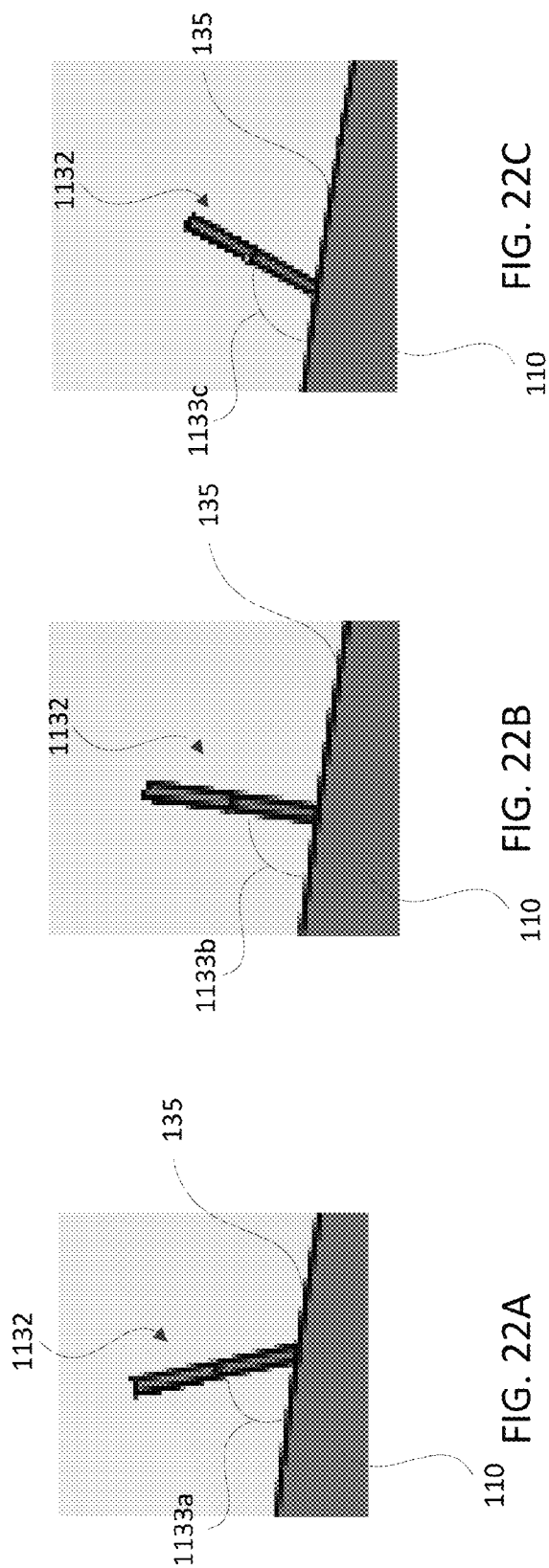
FIGS. 22A-22C illustrate various air deflector configurations according to one or more aspects described herein.

In still other arrangements, the apertures 870 may be arranged randomly or in various other patterns on the air deflector 832 (see, e.g., FIG. 21). In some examples, apertures 870 may be distributed along the air deflector 832 in multiple, different patterns. For instance, the apertures in a first region may be aligned (similar to the arrangement shown in FIG. 19) while apertures 870 in a second region may be arranged randomly throughout that region.

Further, as shown in FIGS. 18 and 19, the apertures 870 may have a uniform size. The size of the apertures 870 may be any reasonable size and may be in a range of 0.01% to 5% of the chord length. Horizontal spacing between apertures (e.g., a horizontal span of air deflector between adjacent apertures) may be between 0.01% and 5% of the chord and vertical spacing (e.g. a vertical span of air deflector between adjacent apertures) between apertures may be between 0.01% and 5% of the chord length.

Although the apertures in FIGS. 18 and 19 are shown as having a uniform size, the apertures 870 may also vary in size along the surface of the air deflector 832. For instance, apertures 870 having various different sizes may be arranged on a single air deflector 832. The apertures 870 may be grouped according to size in various regions of the air deflector 832. For instance, apertures 870 in a first region may have a larger size than apertures in a second region. In another example, the different size apertures may be mixed together and/or randomly distributed along the surface of the air deflector 832.

Although the apertures 870 in FIGS. 18 and 19 are shown as having a generally circular shape, the apertures may be formed as various other shapes without departing from the invention. For instance, the apertures 870 may be triangular, square, rectangular, pentagonal, hexagonal, octagonal, or the like.

FIG. 20 illustrates an alternate air deflector 932 arrangement having apertures 970. Similar to the arrangement of FIGS. 18 and 19, the air deflector 932 includes a substantially rectangular portion 937 which, when deployed, extends upward, away from a surface 135 of the rotor blade 110 to, in some examples, varying heights. The apertures 970 are generally aligned, both horizontally and vertically. However, as discussed above, the apertures 970 may be arranged in various patterns without departing from the invention. Further, although the apertures 970 have a generally uniform size, apertures of various sizes maybe used without departing from the invention.

The apertures 970 of FIG. 20 are arranged in two rows and are generally spaced apart from each other. That is, the substantially rectangular portion 937 includes more surface area than in other example arrangements, which may further alter the airflow through and around the air deflector 932, thereby altering the sound or acoustics generated with the air deflector 932 is deployed.

As also shown in FIG. 20, the apertures may be formed having various shapes. For instance, although circular apertures are shown in various example arrangements described herein, apertures of any shape may be used without departing from the invention. For instance, the apertures may be hexagonal 970*a*, octagonal 970*b*, triangular 970*c*, pentagonal 970*d*, square 970*e*, rectangular 970*f*, and the like. Apertures of different shapes may, in some examples, be used in combination (as shown in FIG. 20), or the apertures on any air deflector may have the same or substantially similar (e.g., consistent) shape.

FIG. 21 illustrates one example air deflector 1032 including a plurality of apertures 1070 arranged randomly along the substantially rectangular portion 1037 of the air deflector 1032. Further, the apertures 1070 are formed having varying sizes. Various other size apertures may be used without departing from the invention.

In some example arrangements, in addition to extending up or down (e.g., away from or toward the surface of the rotor blade), any of the air deflector arrangements discussed herein may also be configured to tilt toward a leading edge of the rotor blade or toward a trailing edge of the rotor blade. For instance, FIGS. 22A-22C illustrate examples of an air deflector 1132 in various positions. Although in some examples, the air deflector may be deployed in a tilted position, in other examples, the air deflector may be configured to be rotated or tilted (e.g., while deployed) to various different angles of tilt in order to adjust the impact of the air deflector. The air deflector may be tilted forward or backward to the flow direction, as desired.

For instance, FIG. 22A illustrates an air deflector 1132. The air deflector 1132 may have any of the configurations, arrangements and/or sizes discussed herein with respect to the various other figures in the disclosure. The air deflector 1132 is shown at a first angle 1133*a* relative to the surface 135 of the rotor blade 110. In FIG. 22B, the air deflector 1132 is shown at a second angle 1133*b* relative to the surface 135 of the rotor blade 110. The second angle 1133*b* is greater than the first angle 1133*a*.

FIG. 22C illustrates the air deflector 1132 at yet another angle 1133*c* relative to the surface 135 of the rotor blade 110. Third angle 1033*c* may be greater than angle 1033*a* and/or 1033*b*. Although three different angles 1033 are shown in FIGS. 21A-21C, the air deflector 1132 may be rotated to various other angles or positions without departing from the invention.

Further, in some examples, the air deflector 1132 may be rotatable to various predetermined positions or angles relative to the surface 135 of the rotor blade 110. That is, the air deflector 1132 may be configured to rotate to certain predetermined positions and be held in place in one of those predetermined positions (e.g., via a mechanical stop, etc.). Additionally or alternatively, the air deflector 1132 may be configured to rotate and be held in place at any angle relative to the surface 135 of the rotor blade 110. For instance, the air deflector 1132 may be able to be positioned at one of an infinite number of positions relative to the surface 135 of the rotor blade 110.

Figure 23:
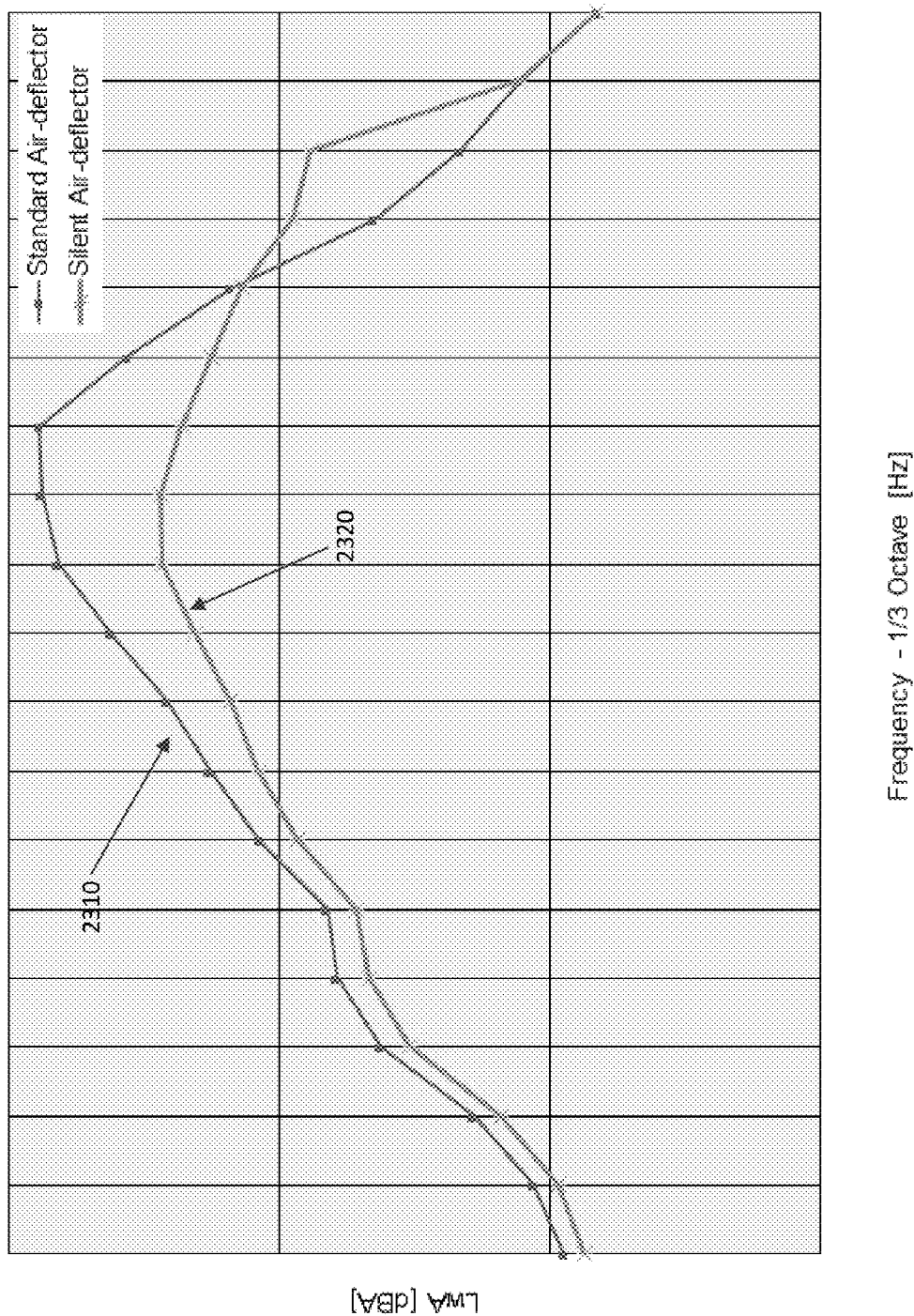
FIG. 23 is a graph illustrating example sound reduction that may be provided by one or more air deflector configurations described herein.

FIG. 23 is a graph illustrating a potential reduction in sound or acoustics that may be provided by use of one or more of the air deflector configurations discussed herein. FIG. 23 is provided to indicate a general reduction in sound or acoustics provided by the various air deflector configurations described herein and is not intended to quantify or illustrate the amount of sound or acoustic reduction provided. It is merely one example of an advantage of the air deflector configurations described herein.

As discussed above, air deflectors are often deployed to aid in reducing load. In some examples, an air deflector may be configured on a wind turbine blade and may be deployed to reduce or adjust the load on the blade during operation. Conventional air deflectors may have a generally rectangular shape and may be solid (e.g., no apertures, protrusions, etc.). Use of these conventional or standard air deflectors can increase the sound generated during operation of the wind turbine above the sound generated by the wind turbine during operation without one or more air deflectors deployed.

Line 1210 in FIG. 23 indicates a level of sound or acoustics generated during operation of a wind turbine with one or more conventional or standard, rectangular air deflectors deployed.

Line 2320 in FIG. 23 indicates one example level of sound or acoustics associated with an air deflectors having one or more of the configuration described herein deployed. Accordingly, this data indicates that, the sound generated by the air deflectors described herein is less than the sound generated by a conventional, standard shaped air deflector.

The air deflector configurations described herein may be formed and/or installed on the airfoil-shaped blade or device during manufacture of the blade or may be installed on airfoil-shaped blades or devices currently in use (e.g., a retrofit arrangement). Further, although the air deflectors may be manufactured having the various shapes and configurations described herein, in some examples, a conventional air deflector may be modified (e.g., in the field) to include some or all of the aspects described herein. For instance, an upper portion having scallops, teeth, or the like, may be connected to an existing, substantially rectangular air deflector in order to provide the sound or acoustic reduction advantages describes herein without requiring replacement of the air deflector.

Further, many example airfoil-shaped blades may include a plurality of load compensating devices and/or air deflectors mounted thereon. Accordingly, the plurality of air deflectors on any given airfoil-shaped blade may be the same shape or configuration, or may include a variety of different shapes or configurations (e.g., differently shaped air deflectors may be used in combination on a single airfoil-shaped blade, as desired).

As discussed herein, although various examples describe and/or illustrate the use of various air deflector configurations with a wind turbine blade, the air deflectors, or similarly configured devices, may be used with any aerodynamic body, including various types of airfoil shaped devices, such as helicopter/autogyro blades, aircraft lifting surfaces, automobiles, propellers, and the like. Nothing in the application should be viewed as limiting the air deflector devices to use only with wind turbines.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While the aspects described herein have been discussed with respect to specific examples including various modes of carrying out the invention, those skilled in the art will appreciate that there are numerous variations and permutations of the above described systems and techniques that fall within the spirit and scope of the invention.

We claim:

1. An airfoil-shaped device, comprising:
   a leading edge;
   a trailing edge;
   a deployable air deflector, the deployable air deflector being configured to deploy transversely outward from a first position within an interior space of the device to a second position extending transversely outward from a surface of the device, the deployable air deflector including a plurality of apertures extending through the deployable air deflector.

2. The airfoil-shaped device of claim 1, wherein the second position is a fully deployed position of the air deflector.

3. The airfoil-shaped device of claim 2, wherein the deployable air deflector is configured to be positioned at various positions between the first position within the device and the second, fully deployed position of the air deflector.

4. The airfoil-shaped device of claim 1, wherein the plurality of apertures include adjacent apertures that are aligned horizontally.

5. The airfoil-shaped device of claim 1, wherein the plurality of apertures include adjacent apertures that are aligned vertically.

6. The airfoil-shaped device of claim 1, wherein the plurality of apertures includes apertures having a substantially uniform size.

7. The airfoil-shaped device of claim 1, wherein the deployable air deflector is rotatable to tilt the deployable air deflector toward the leading edge or toward the trailing edge.

8. The airfoil-shaped device of claim 1, wherein the airfoil-shaped blade is at least one of: a wind turbine blade, a helicopter blade, and an aircraft lifting surface.

9. An airfoil-shaped device, comprising:
   a leading edge;
   a trailing edge;
   a deployable air deflector, the deployable air deflector being configured to deploy transversely outward from a first position within an interior space of the device to a second position extending transversely outward from a surface of the device, the deployable air deflector including a first portion having a substantially planar surface and including a plurality of apertures extending through the first portion of the deployable air deflector, the plurality of apertures including apertures having at least two different sizes.

10. The airfoil-shaped device of claim 9, further including a second portion arranged along an edge of the first portion distal from the surface of the device.

11. The airfoil-shaped device of claim 10, wherein the second portion extends outward from the first portion in a direction substantially perpendicular to the planar surface of the first portion.

12. The airfoil-shaped device of claim 9, wherein the deployable air deflector is configured to be positioned at various positions between the first position within the device and the second position, the second position being a fully deployed position of the air deflector.

13. The airfoil-shaped device of claim 9, wherein the apertures include apertures having at least two different shapes.

14. The airfoil-shaped device of claim 9, wherein the apertures include apertures having a uniform shape.

15. The airfoil-shaped device of claim 9, wherein the airfoil-shaped device is at least one of: a wind turbine blade, a helicopter blade, and an aircraft lifting surface.

16. A wind turbine, comprising:
    a rotor having an airfoil-shaped blade, the airfoil-shaped blade including an air deflector, the air deflector being movable between a first position in which the air deflector is recessed within the airfoil-shaped blade to a second position in which the air deflector extends outwardly from an exterior surface of the airfoil-shaped blade, the air deflector further including a plurality of apertures extending entirely through the air deflector; and
    a load compensating device configured to extend the air deflector from the first position to the second position.

17. The wind turbine of claim 16, wherein the plurality of apertures include apertures of different sizes.

18. The wind turbine of claim 16, wherein the plurality of apertures include apertures of different shapes.

19. The wind turbine of claim 16, wherein the plurality of apertures include apertures having a uniform shape.

* * * * *